United States Patent [19]

Muftic

[11] Patent Number: 5,745,574
[45] Date of Patent: Apr. 28, 1998

[54] SECURITY INFRASTRUCTURE FOR ELECTRONIC TRANSACTIONS

[75] Inventor: Sead Muftic, Hasselby, Sweden

[73] Assignee: Entegrity Solutions Corporation, San Jose, Calif.

[21] Appl. No.: 573,025

[22] Filed: Dec. 15, 1995

[51] Int. Cl.[6] ........................................ H04K 1/00
[52] U.S. Cl. ................................. 380/23; 380/25
[58] Field of Search ........................ 380/23, 24, 25, 380/21, 49

[56] References Cited

U.S. PATENT DOCUMENTS

| | | | |
|---|---|---|---|
| 4,200,770 | 4/1980 | Hellman et al. | |
| 4,218,582 | 8/1980 | Hellman et al. | |
| 4,405,829 | 9/1983 | Rivest et al. | |
| 4,424,414 | 1/1984 | Hellman et al. | |
| 4,562,305 | 12/1985 | Gaffney, Jr. | |
| 4,995,082 | 2/1991 | Schnorr | |
| 5,214,702 | 5/1993 | Fischer | 380/23 |
| 5,347,580 | 9/1994 | Molva et al. | 380/25 |
| 5,369,705 | 11/1994 | Bird et al. | 380/21 |
| 5,420,927 | 5/1995 | Micali | 380/23 |
| 5,497,421 | 3/1996 | Kaufman et al. | 380/23 |
| 5,509,071 | 4/1996 | Petrie et al. | 380/21 |
| 5,604,804 | 2/1997 | Micali | 380/23 |
| 5,606,617 | 2/1997 | Brands | 380/30 |

OTHER PUBLICATIONS

Philip Zimmerman, "Pretty Good(tm) Privacy Public Key Encryption for the Masses", RGP Version 2.6.2 —Oct. 11, 1994.

"Privacy Enhancement for Internet Electronic Mail", Network Working Group, Request for Comments: 1421.

"Privacy Enhancement for Internet Electronic Mail", Network Working Group, Request for Comments: 1422.

*Primary Examiner*—David C. Cain
*Attorney, Agent, or Firm*—Lowe, Price, LeBlanc & Becker

[57] ABSTRACT

A plurality of certification authorities connected by an open network are interrelated through an authentication and certification system for providing and managing public key certificates. The certification system with its multiple certification and its policies constitute a public key infrastructure facilitating secure and authentic transactions over an unsecure network. Security services for applications and users in the network are facilitated by a set of common certification functions accessible by well-defined application programming interface which allows applications to be developed independently of the type of underlying hardware platforms used, communication networks and protocols and security technologies.

34 Claims, 29 Drawing Sheets

SECURITY INFRASTRUCTURE FOR ELECTRONIC TRANSACTIONS

TECHNICAL FIELD

The invention is directed to computer communication systems and more particularly to public key encryption based secure communication systems.

BACKGROUND ART

Encryption of information is normally undertaken to ensure privacy, that is, so that no one other than the intended recipient can decipher the information. Encryption is also undertaken to ensure the authenticity of the information, that is, that a message which purports to originate with a particular source actually and has not been tampered with.

"Encrypting" or "enciphering" a message means to scramble it in a way which renders it unreadable to anyone except the intended recipient(s). In one form, a cryptographic "key" is utilized to encrypt the message and the same key is required to transform it from encrypted form back to plain text by deciphering or decrypting it. An encryption system which operates in this way is known as a "single-key" encryption system. In such a system, the key must be available to both the sender and the receiver. If unauthorized persons have access to the key, then they can decrypt the encoded message and the object of privacy is defeated. The most obvious drawback of single key encryption systems is that it is not often convenient to provide the sender and the receiver with keys. They may be located far apart. A key can be transmitted across a secure channel from the sender to the receiver, but if a secure channel is available, there is no need for encryption.

In a public key encryption system each participant has two related keys. A public key which is publicly available and a related private key or secret key which is not. The public and private keys are duals of each other in the sense that material encrypted with the public key can only be decrypted using the private key. Material encrypted with the private key, on the other hand, can be decrypted only using the public key. The keys utilized in public key encryption systems are such that information about the public key does not help deduce the corresponding private key. The public key can be published and widely disseminated across a communications network or otherwise and material can be sent in privacy to a recipient by encrypting the material with the recipient's public key. Only the recipient can decrypt material encrypted with the recipient's public key. Not even the originator who does the encryption using the recipient's public key is able to decrypt that which he himself has encrypted.

Message authentication can also be achieved utilizing encryption systems. In a single key system, a sender, by encrypting a message with a key known only to authorized persons, tells the recipient that the message came from an authorized source.

In a public key encryption system, if the sender encrypts information using the sender's private key, all recipients will be able to decipher the information using the sender's public key, which is available to all. The recipients can be assured that the information originated with the sender, because the public key will only decrypt material encrypted with the sender's private key. Since presumably, only the sender has the private key, the sender cannot later disavow that he sent the information.

The use of encryption techniques provides a basis for creating electronic signatures to documents which are even less subject to forgery than handwritten signatures. There are two ways in which encryption can be utilized to "sign" a document. The first method is by encrypting the entire document using the signer's private key. The document can be read by anyone with the signer's public key and, since the signer alone possesses his private key, the encrypted document surely originated with the signer. Encryption of large documents requires considerable computational resources and, to speed up the process, a message digest may be used.

A message digest of the document is analogous to a cyclic redundancy code (CRC) check sum attached to the end of a packet. The information in the body of the packet is processed mathematically to produce a unique check sum which is appended to the end of the packet. The integrity of the body of the packet is checked at the receiving end by recalculating the check sum based on the received text and verifying if it matches the check sum appended to the packet. If it does, one assumes that the contents of the body of packet is unchanged from that present at the sending end. The same can be done with entire documents.

In modern implementations, a message digest is created using a cryptographically strong one way hash function between the message text and the output digest and the message digest operates like a CRC check sum.

A clear text document may be signed by creating the message digest and then by encrypting the message digest using the signer's private key. Authentication that the content of the document has not been changed is achieved by computing the same one way hash function of the received text, from the text, and comparing it with the message digest decrypted using the signer's public key. If they agree, one may have a high degree of confidence that the document has been unchanged from the time it was signed, until the present and further, that that which the sender "signed" was the same document.

Public key encryption software is widely available. For example, Pretty Good™ Privacy public key encryption software is available for non-commercial use over the Internet in a form published by Phillip Zimmerman. One version, is PGP version 2.6.2 of Oct. 11, 1994. It is available from the Massachusetts Institute of Technology at net-dis.mit.adu, a controlled FTP site that has restrictions and limitations to comply with export control requirements. Software resides in the directory /pub/PGP. A fully licensed version of PGP for commercial use in the U.S.A. and Canada is available through ViaCrypt in Pheonix, Ariz.

Some public key encryption systems utilize a single key encryption of the body of the text with the key changing from session to session and with the key encrypted utilizing the recipient's public key to encrypt the session key so that the encryption and decryption times are quicker.

The Federal Data Encryption Standard (DES) is one available form of single key encryption system.

No data security system is impenetrable. In any data security system, one must question whether the information protected is more valuable to an attacker than the cost of the attack. Public key encryption systems are most vulnerable if the public keys are tampered with.

An example will illustrate the problem. Suppose an originator wishes to send a private message to a recipient. The originator could download the recipient's public key certificate from an electronic bulletin board system and then encrypt a letter to the recipient with that public key and send it to him using an Internet E-mail message. Unfortunately, in the example, an interloper has generated a public key of his own with the recipient's user ID attached to it and substituted the phony public key in place of the recipient's real public key. If the originator unwittingly used the phony public key belonging to the interloper instead of to the intended recipient, everything would look normal because the phony key has the recipient's user ID. Now the interloper is in a position to decipher the message intended for the recipient because the interloper has the related private key. The interloper may even go so far as to reencrypt the deciphered message with the recipient's real public key and send it on to the recipient so that no one suspects any wrongdoing. Worse yet, the interloper can make apparently good signatures on behalf of the recipient using the phony private key because everyone will believe the phony public key is authentic and will utilize it to check the recipient's signatures.

To prevent this from happening, requires preventing anyone from tampering with public keys. If one obtained the recipient's public key reliably directly from the recipient, there is no doubt about the authenticity of the public key. However, where the public key is acquired from a source of uncertain reliability, there may still be a problem. One way to obtain the recipient's public key would be to obtain it reliably from a trusted third party who knows he has a good copy of the recipient's public key. A trusted third party could sign the recipient's public key, utilizing the trusted third party's private key, thus vouching for the integrity of the recipient's public key. However, to be sure that the third party's public key is authentic, requires that the sender have a known good copy of the third party's public key with which to check its signature. A widely trusted third party could specialize in providing a service of vouching for the public keys of other parties. This trusted third party could be regarded as a key server or as a certifying authority. Any public key certificates bearing the certifying authority's signature would be trusted as truly belonging to whom they appear to belong to. Users who desire to participate would need a known authentic copy of the certifying authority's public key so that the certifying authority's signatures could be verified.

Public key encryption systems are also subject to a vulnerability involving the use of bogus time stamps. A user may alter the date and time setting of the user's systems clock and generate either public key certificates or signatures that appear to have been created at a different time. He can make it appear that a document was signed earlier or later than it was actually signed or that the public's secret key pair was created earlier or later. This may have some type of benefit, for example, by creating circumstances which might allow him to repudiate a signature. In situations where it is critical that a signature have the actual correct date and time, an electronic equivalent of a notary can be utilized. An electronic notary would apply the notary's electronic signature to other people's electronic signatures, thus witnessing the date and time of the signed document. A notary could actually maintain a log of detached signature certificates and make it available for public access. The notary's signature would have a trusted time stamp which might carry more credibility than a time stamp on the original signature alone.

In most open network architectures, security is an ad hoc thing. Individual stations having access to the network may or may not choose to utilize encryption in their transmissions. If they do so, they alone are responsible for ensuring that they have authentic public keys of the persons with whom they are communicating. Some efforts have been made to standardize security procedures for such a network. For example, the current state of the development for secure systems across the Internet is found in the Network Working Group Request For Comments No. 1421, dated February 1993 (RFC 1421). This document addresses proposals for privacy enhancement for Internet electronic mail, namely, message encryption and authentication procedures. That document is incorporated in its entirety by reference into this application.

A second proposal, Network Working Group Request For Comments No. 1422, also dated February 1993, addresses privacy enhancement for Internet electronic mail and particularly addresses certificate-based key management. This document is also incorporated by reference into this application in its entirety.

These proposals incorporate concepts utilized in the X.400 Message Handling System model of CCITT Recommendation X.400, the directory system Recommendation X.500 and the CCITT 1988 Recommendation X.509 directed to an authentication framework.

One of the problems with the prior art proposals is that they are directed primarily to Internet mail and do not cover a variety of the other types of services which might be performed over an open network. Specifically, they do not address secure transactions utilizing HTTP (Hypertext Transfer Protocol) and they do not address program-to-program communications.

Another problem with the prior art identified above is that for the most part these represent recommendations and proposals and do not represent actual implementations of systems for carrying out secure transactions.

Another problem with the prior art is that it does not provide a consistent application programming interface usable in all types of environments where secured transactions are needed.

Another problem with the prior art identified above is that it is not functionally complete and consistent, since it lacks specifications of certain types of control messages and protocols which are essential for correct functioning of certificate infrastructure.

Another problem with the prior art is that there is no consistent public key infrastructure which can actually and automatically provide the certifications required for a public key system.

Another of the problems with the prior art is that there is no hierarchical arrangement of certifying authorities which can cross policy certifying authority boundaries in pursuit of a global authorization system which will permit secure transactions to be undertaken worldwide transparently.

Another problem of the prior art is that there is no way for permitting secure transactions to cross organizational boundaries in a way that is convenient and transparent.

DISCLOSURE OF THE INVENTION

One advantage provided by the invention is that of providing a full, correct, consistent and very general security infrastructure which will support global secure electronic transactions across organizational, political and policy certifying authority boundaries.

Another advantage of the invention lies in providing consistent application programming interfaces which can be utilized in all types of electronic transactions for ensuring security and authenticity of all kinds of electronic documents.

Another advantage of the invention resides in the ability to provide efficient key management and distribution in a secure manner by several different ways, more effective than existing models, and in a manner which protects public keys from tampering.

Another advantage of the invention is the provision of trusted third party and notary services.

Another advantage of the invention is the provision of privacy and authenticity in the transmission of information by way of a general set of computer communication protocols and applications with consistent and easy to use interfaces to these functions.

Another advantage of the invention is the provision of a certificate-based public key system in which certificates are verifiable and readily available.

Another advantage of the invention is to provide a system where certificates are readily accessible and verifiable.

These and other advantages of the invention are achieved by providing a multi-hierarchical certification system for issuing and authenticating public keys used for all types of electronic transactions and applications.

Such a system may or may not comprise a distinguished certification authority representing a root node (or registration authority (RA) level) of a certification hierarchy. This certification authorities certifies one or more second certification authority at a policy certification authority (PCA) level. One or more third certification authorities are certified by each certification authority at a hierarchy certification authority (CA) level. Certification authority processes lower in the hierarchy than a certification authority process operating at the policy certification authority level all operate in according with the security policies set by a policy certification authority. Certification authorities, operating at the hierarchy certification authority level may certify other CA level computer processes in hierarchical fashion. Generally, one or more end users are certified by the lowest CA and form an end user level.

Multi-hierarchical certification system may be established as the number of autonomous certification hierarchies, operating without a single, top-level certification authority. In that case, some form of cross-certification is needed for their secure cooperation. Certification authorities at lower levels in the same or in different hierarchies may also cross-certify each other.

Each certification authority process in the hierarchy, except the RA process, holds a data structure electronically signed by at least one higher level computer process. In this manner, the certification authority processes are arranged in a certification hierarchy.

One or more of the certification authorities in the hierarchy may function as a trusted third party, as an electronic notary or as a common public key certificate repository.

A common certificate repository may contain public key certificates for all certification authorities in the hierarchy and/or certificate revocation lists for a plurality of all users or computer processes in the hierarchy.

Each user or certification authority of the infrastructure has access to a computer process which comprises appropriate certification software and storage areas for storing data structures known as public key certificates, for storing certificate revocation lists, and optionally for storing network map information, error code and message information and registration information.

Each computer process utilizes a common application programming interface for access to encryption and certification services. The application programming interface is a set of certification functions which can be invoked by commands or by messages, such as an http command, an email message or program to program communication.

The invention is directed to a certification system for issuance, distribution and verification of public key certificates which may be used for secure and authentic electronic transactions over open networks, which system includes computer processes implementing certification servers, certification clients and certification protocols, in which one or more first computer processes are associated with at least one initial (root) registration authority, one or more second computer processes are associated with policy certification authorities, one or more third computer processes are associated with certification authorities, and one or more end-user computer processes or application computer processes are associated with respective end-users or user applications. The second computer processes hold a data structure certified by said registration authority, the third computer processes hold a data structure certified either by one of said policy certification authorities or other certification authorities, and end-user or application computer processes hold a data structure certified by one or more of said certification authorities. As a result, users and applications of said system are logically located at end-points of certification chains in a certification infrastructure.

One or more of the computers in the infrastructure may function as a trusted third party, as an escrow agency, as an electronic clearing house for or insurer of electronic transactions, as an electronic Notary or as a common public key certificate repository.

A common certificate repository may contain public key certificates for all computers in the infrastructure and/or certificate revocation lists for a plurality of computers in the infrastructure.

Each computer of the infrastructure comprises storage areas for storing data structures such as electronic addresses, electronic identities or public key certificates, and for storing certificate revocation lists, for storing network configuration information, error code and messages and/or entity identification information.

Each computer utilizes a common application programming interface either for remote access to that process or for access to encryption, certification and other local services. The application programming interface comprises a set of primitives which can be invoked by commands, by messages, by remote procedure calls or by any other type of computer procedure invocations such as http commands or program to program communications.

The invention is also directed to a method of requesting and issuing a public key certificate in a certification system for secure communications containing computer processes arranged in a certification infrastructure, by generating a data structure containing the data items required for a public key certificate at a requesting computer process, including a public key, self-signing the data structure and sending the signed data structure as a certificate signature request to a computer process authorized as an issuing certification authority, and verifying the authenticity of said request at a computer process authorized as an issuing certification authority, and if authentic, certifying and returning the data structure in a certificate signature reply. The received signed certificate, or a copy, is stored either at said requesting computer process or at a common certificate repository. This method is invoked when adding a new entity to a certification infrastructure or upon expiration of an existing certificate.

The invention is also directed to a method of verifying a signed data structure sent from a sender to a receiver by obtaining a public key certificate for every computer in the infrastructure between the sender and a common point of trust in the infrastructure and verifying the authenticity of each signature iteratively, beginning with the common point of trust. Public key certificates for every computer in the infrastructure between the sender and a common point of trust may be obtained from a common repository or from respective individual computers. To ensure validity of a certificate, is verified against one or more or preferably all relevant certificate revocation lists and/or by a common repository. A public key certificate of a sender may also be verified by a direct inquiry to the certification authority which issued that certificate.

The invention is also directed to a method of validating public key certificates by using the certificate revocation lists of each computer process between a computer process or user whose certificate is being validated and a point of trust in common with the computer process or user which is validating the certificate to ensure the certificates being used in the validation process do not appear on any certificate revocation list.

The invention is also directed to a method of updating certificates by:

a. at a first computer process, which possesses a certificates to be updated, updating the current certificate by
   a.1. receiving a new signed certificate from a computer process which is authorized to issue the new signed certificate,
   a.2. revoking the current certificate previously used for verification of certificates of subordinate computer processes,
   a.3. issuing new certificates to all subordinate computer processes for which certificates had been previously signed by the first computer process and copying to all subordinate computer processes the new certificate to be used for verification of new subordinate certificates, and
b. iteratively performing the distribution of the new certificate to all subsequent subordinate computer processes, until all computer processes subordinate in the infrastructure to said first computer process have the new certificates.

The invention is also directed to a method of adding a new computer process to the infrastructure by adding a new component to a representation of a certification infrastructure at a location indicative of where the said computer process is to be added, creating entries in a certificate storage database at least at both said new computer process and at the computer process authorized to certify the said new process, and obtaining a signed certificate for the said new computer process from said computer process authorized to certify the new process and storing it at the said new computer process.

The invention is also directed to a method of deleting an existing computer process from the infrastructure by notifying at least all computer processes certified by the existing process being deleted that said existing computer process is being deleted, revoking all certificates signed by said first computer process at said computer processes certified by the existing process being deleted, if any; and obtaining new certificates for each computer process previously being certified by the said existing computer process being deleted from another certification authority being authorized to certify these computer processes in the new certification infrastructure. All certificates revoked are added to a certificate revocation list.

The invention is also directed to a method of restructuring at least part of the certification infrastructure by deleting one or more certification authorities and adding said one or more certification authorities or new certification authorities so as to derive a modified form of the certification infrastructure.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1A:
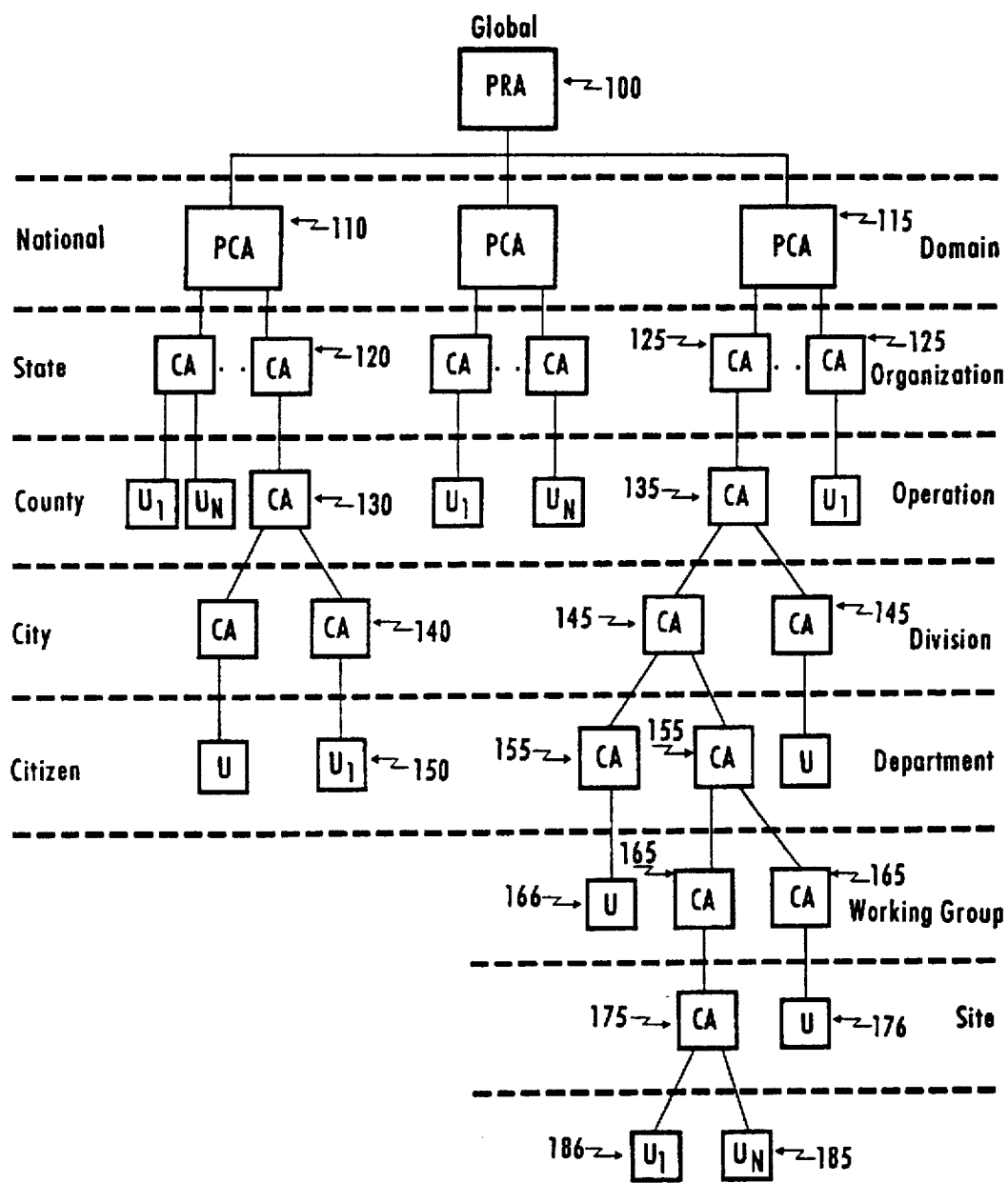
FIG. 1A is a logical representation of a hierarchical security or public key infrastructure in accordance with the invention.

FIG. 1A is a logical representation of a hierarchical security or public key infrastructure in accordance with the invention. Each block illustrated in FIG. 1 represents a certification authority which either uses or performs function within the public key infrastructure, or both. Although in actuality, each of the blocks in FIG. 1 is connected to a communications network so that each certification authority may exchange information with any other, a logical hierarchical arrangement is shown with the various levels representing where a particular certification authority is positioned in the certification hierarchy. Certification may be as simple as merely signing a public key certificate of a "subordinate" user, certification authority or computer or it may involve carrying out a full set of activities specified by a security policy. At the highest level of the certification hierarchy may be the root of the hierarchy, a Policy Registration Authority (PRA), with global jurisdiction. This PRA is equivalent to that envisioned for an Internet policy registration authority in RFC 1422. Beneath the policy registration authority are Policy Certification Authorities (PCA), each of which defines a particular set of certification policies which differ from PCA to PCA. Policy certification authorities set the standards for their particular certification sub-hierarchies. A policy certification authority could, for example, be a standards body of a particular national government. Alternatively, a policy certification authority might be the chief information officer of a multinational corporation. What is important is that organizational entities operating under a substantively different set of policies should interface through their policy certification authorities. Below the policy certification authorities are certification authorities such as 120, all of which follow the policies set by PCA 110. Certification authorities can then certify sub-certification authorities in a hierarchical fashion until ultimately the end users are certified at the bottom of the hierarchy.

In FIG. 1, as an example, policy certification authority 110 may be established as a national certification authority, say, for example, for the U.S.A. Underneath the policy certification authority are certification authorities 120 which could, pursuing the hypothetical, be established for each state in the United States. Beneath that could be certification authorities 130 for county governments, and under that certification authority for cities at 140 and ultimately down to the residential user level at 150. The particular division and assignment of certification authorities are established by the policies established by the PCA. Policy certification authority 115 might service a number of corporations each having their own certification authorities 125. Company wide CA 125 might then certify a number of operations such as 135 within the company. Each operation might then certify its divisions 145 and the divisions might certify departments 155 and the departments might certify working groups 165 and user's 166. The working groups might then certify site 175 and user 176 and the site might certify, ultimately, end organizational users 186.

Each of the blocks in FIG. 1A is implemented as a computer process running on a computer. Depending on implementation, several certifications may be implemented at the same computer. More than one block, e.g. more than one certification authority, may run on a single computer. The particular kind of computer is not particularly important although multitasking Unix machines are preferred, such as those made by Sun, Hewlett-Packard, etc. In addition to the usual compliment of input output devices and system software, each computer is equipped with a network access permitting it to communicate over a network with other stations. Each computer has a memory and storage capabilities in quantities and type which vary from machine to machine.

Figure 1B:
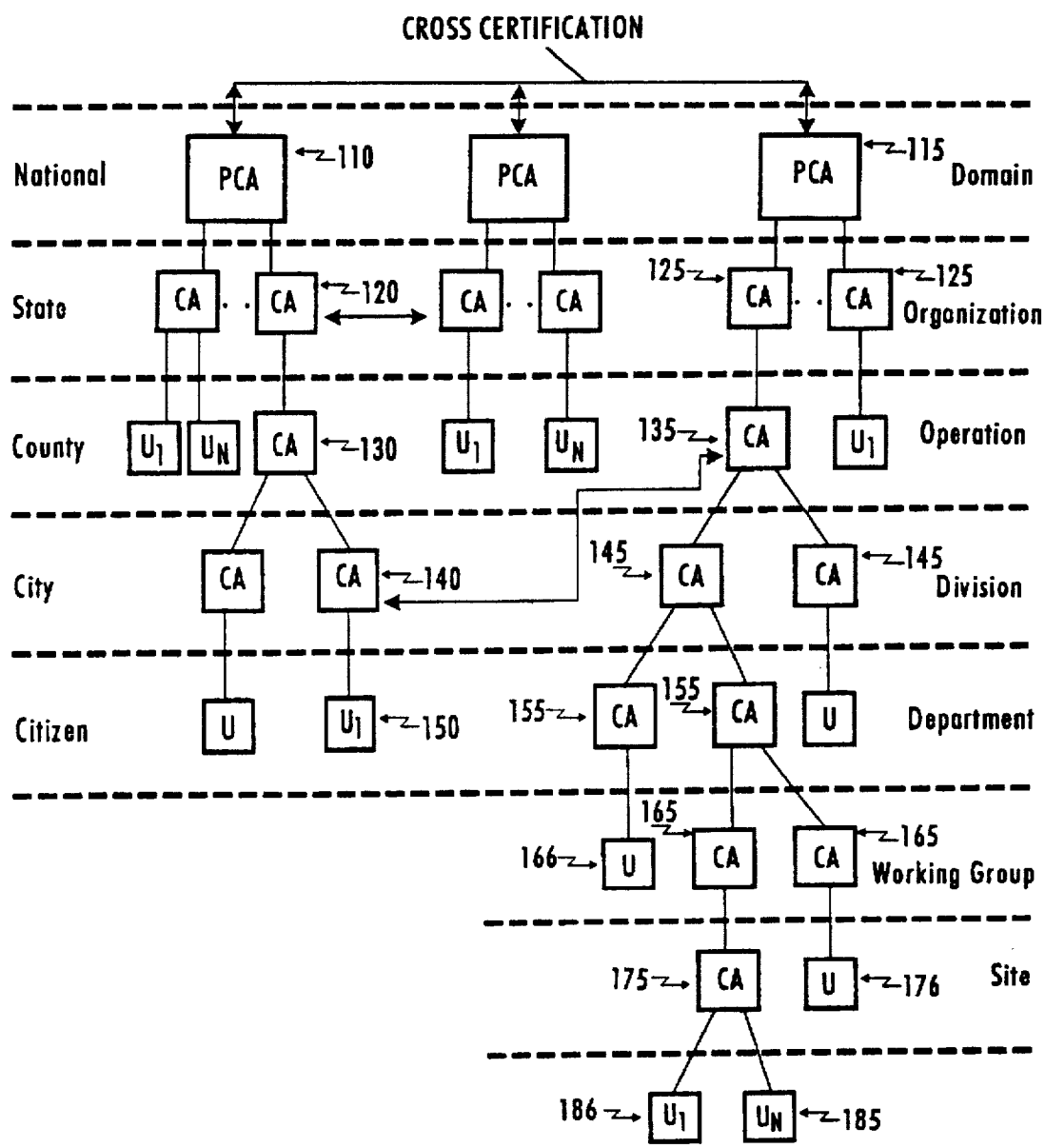
FIG. 1B is a logical representation of a non-hierarchical security or public key infrastructure in accordance with the invention.

FIG. 1B is similar to the system shown in FIG. 1A except there is no single root authority. Certification authority is distributed across the network in a matrix rather than hierarchical fashion. With this architecture, certifying authorities analogous to policy certifying authorities cross certify each other, so that there is common agreement across the network as to who is authorized to certify.

Figure 2:
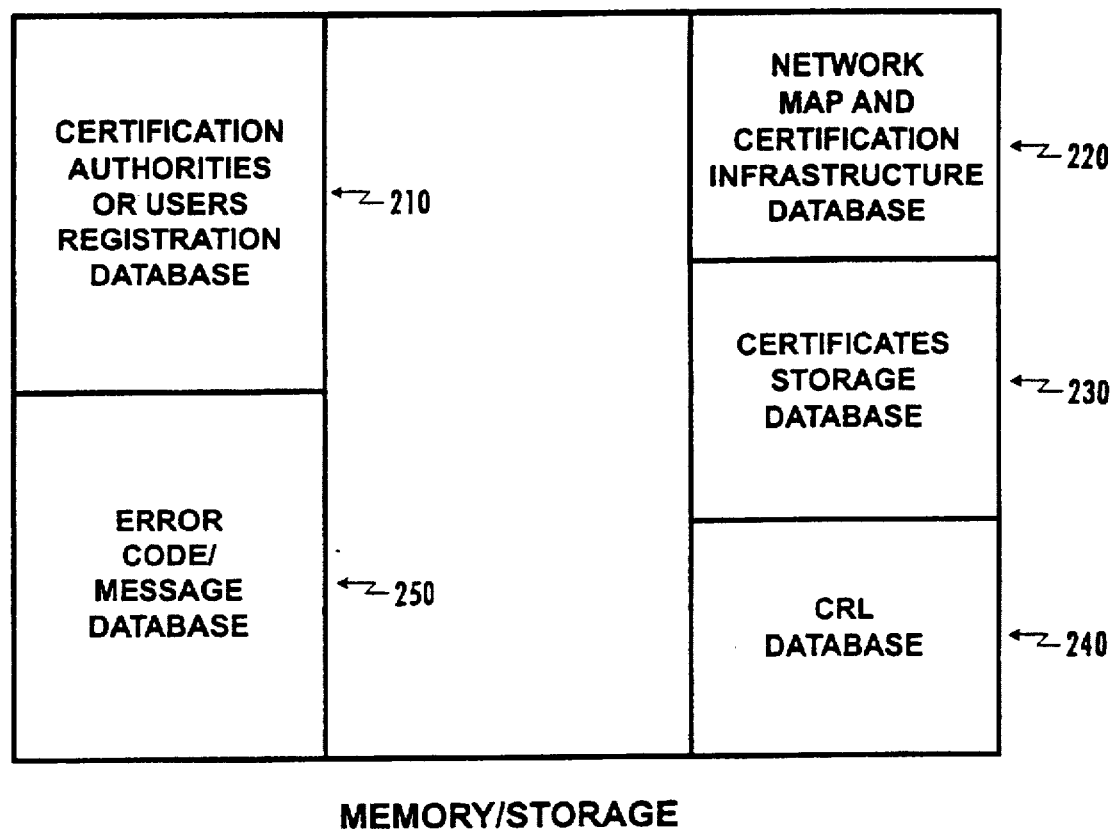
FIG. 2 is a representation of certain data bases preferably implemented in accordance with the invention.

FIG. 2 illustrates an allocation of memory or storage or both to certain types of data base functions. A registration data base for certification authorities and users exists at 210. A network map and certification infrastructure data base is shown at 220. A certificate storage data base is shown at 230. A certification revocation list (CRL) data base is shown at 240 and an error code/message data base is shown at 250. Access to a data base may be through a data base management system, typically and preferred, and the various data bases may be maintained as separate data bases or as components of one large data base. The data base functionality is important and not particularly where, nor in what manner of storage the records for the data base are maintained. Typically, the allocation between memory and longer term storage is made on the basis of performance characteristics needed.

In accordance with the invention, secure electronic documents and the handling of public keys in an open network, such as Internet, are based on some type of certificate. A certificate is specially constructed data structure which contains the user's public key. Further, a certificate contains unique identification of the public key owner and some additional parameters related to the validity of the certificate. In order to guarantee the integrity, authorization and originality of certificate data, each certificate must be issued by an authority, in this context, called a Certification Authority (CA). The Certification Authority vouches for the identity of the public key owner, for the integrity of the public key itself, for the binding between the public key and the owner's identity, and optionally for some additional capabilities of the certificate owner in the electronic environment. This guarantee is reflected in the certificate through the identity of the authority, together with the authority's digital signature to the certificate. Certificates may further may contain references to the types and purposes of public keys, to the relevant certification policies and eventually to the authorization privileges of certificate owners. Certificates may contain other parameters relevant for the purposes and usages of certificates and public keys.

Figure 3:
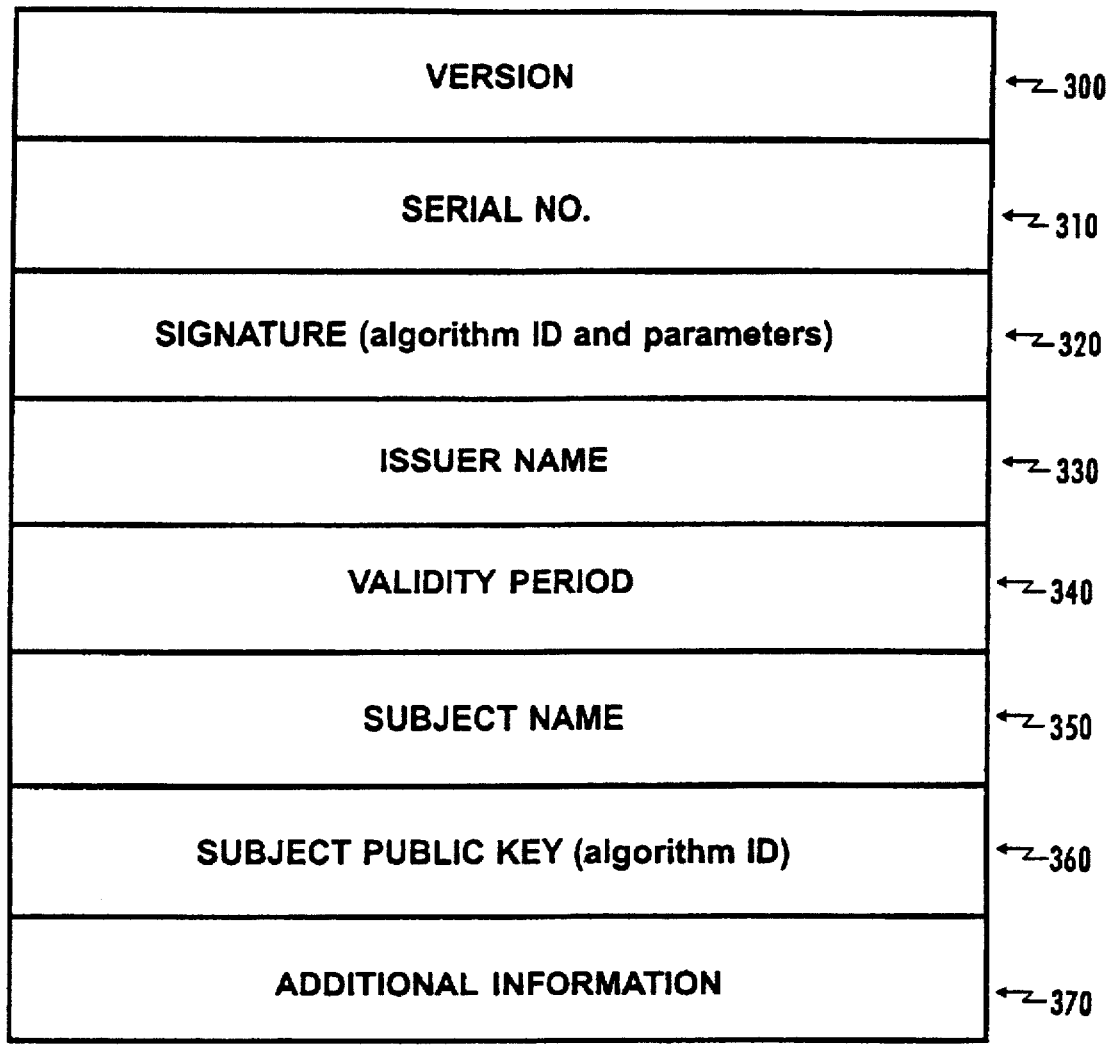
FIG. 3 represents a data structure of a public key certificate.

A certificate is a data structure. A sample of such a data structure is represented in FIG. 3. The version number of the certificate, shown at item 300, is intended to facilitate orderly changes in certificate formats over time. Typically, version numbers may be those utilized in the X.509 recommendation by default.

Serial Number 310, is a short form, unique identifier for each certification generated by an issuer. A serial number is unique only to an issuer. That is, an issuer will not issue two certificates with the same serial number. The serial number is used in certificate revocation lists (CRL's) to identify revoked certificates.

Item 320 represents the electronic signature of the issuer together with the algorithm and parameters utilized to sign the certificate.

Item 330 represents the issuer's name which is a representation of the issuer's identity, preferably in the format of a distinguished name as set forth in the X.500 directory system.

The validity period is a pair of date and time indications indicating the start and end of the time period over which a certificate is valid.

The subject name, shown at item 350, is also a distinguished name such as that utilized in an X.500 directory system.

Item 360 shows the public key of the subject which is being certified by the certifying authority.

Finally, item 370 contains additional information which is optional which might be useful to the purposes discussed above.

The registration process for a certification authority which desires to participate in the security or public key infrastructure begins with an application which provides the various kinds of information required by the policy certifying authority. The information on the application is verified either automatically or manually, depending on the policy, and if the application meets acceptance criteria, the certification process may begin.

Certification begins with a message sent from the station desiring certification to the certifying authority or by receiving that notification in any other way. Typically, this is done in a Certificate_Signature_Request message. The format of the Certificate_Signature_Request includes a certificate filled in with at least the public key which the requesting entity desires to have certified. The submission may be self-signed using the requestor's private key and transmitted to the CA for signature. It is possible, of course, to include all of the application information as part of the Certificate_Signature_Request sent to the CA with the main purpose to allow the receiving CA to verify the correctness and authorization of the received request. When the CA receives the Certificate_Signature_Request, the information contained therein is validated in accordance with the policies established by the PCA, and if the information is correct, the certifying authority issues a Certificate Signature_Reply message returning to the requesting entity a signed certificate. When the requesting entity receives the Certificate_Signature_Reply message, it undertakes a Receive_Certificate process which verifies the signature on the certificate and stores it in a local certificate data base after verifying that the public key contained in the certificate corresponds to the entity's private key.

As used herein, a descriptor such as Certificate_Signature_Request can refer to either a process which generates a Certificate_Signature_Request message, the message itself, a command or any other method which initiates the certification process. These distinct usages are apparent from the context.

Once the initiator is in possession of a signed certificate from a certifying authority, the entity is prepared to engage in other secured transactions as described hereinafter. If the entity is a CA it may perform other certification functions. If the entity is end user, it may perform secure transactions and certification functions.

Figure 4:
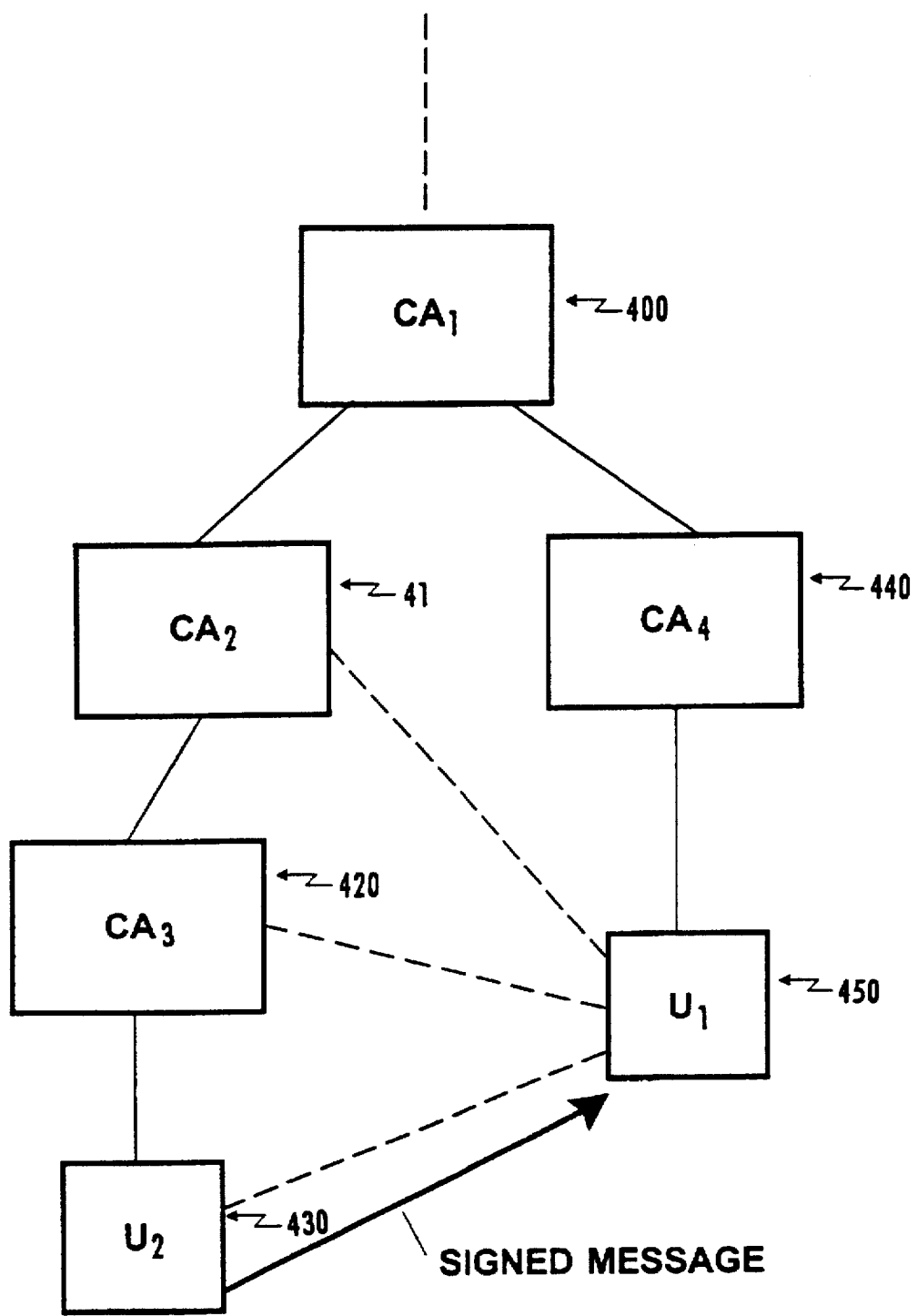
FIG. 4 illustrates how the a public key infrastructure can be utilized to verify transactions.

FIG. 4 illustrates how the public key infrastructure in accordance with the invention can be utilized to verify transactions. In this example, assume that user U2 (430) sends a signed message to user U1 (450). It is convenient and preferred for each user, such as U1, to have certificates stored in their certificate storage data base 230, for themselves and for each station between the user U1, and the policy registration authority.

Although user U2 could have sent a certificate with a signed message, for this example, we will assume that U2 did not include a certificate. Thus, for user U1 to have confidence that the signed message is genuine and that it originated with U2, the signature must be verified. To do this, user U1 sends a Certificate_Request message to user U2 and to certifying authorities CA2 and CA3. Since CA1 is in the direct chain of hierarchy between U1 and the PRA, the certificate storage data base of station U1 presumably contains a certificate for CA1. User U1 sends a Certificate_Request Message to user U2, CA2 and CA3. When user U1 receives Certificate_Reply messages from these entities, their certificates are extracted, verified and stored in the certificate storage data base. They are then utilized as follows:

Since the certificate received from station CA2 is signed by CA1 and since U1 already has a certificate of CA1 in the certificate storage data base, CA2's certificate can be authenticated by using the locally stored version of CA1's public key. If it verified properly, then CA2's certificate is accepted as valid. Since CA3 was certified by CA2 and since U1 now has a valid certificate for CA2, which it placed in storage when received, U1 can verify the certificate of CA3 by utilizing the public key for CA2 to verify the signature of the certificate of CA3. If it verifies properly, then the certificate for CA3 is accepted as valid and one can utilize the public key contained therein to verify the certificate of station U2 by verifying U2's certificate signature with the public key contained in CA3's certificate. Thus, having a known valid certificate for U2, U1 may verify the signed message using the public key of U2's and thus have considerable confidence that the message is authentic and that no public keys have been tampered with. Station CA1 represents the "common point of trust" in the hierarchy in that it is the lowest point in the hierarchy which is common to both the sending and receiving stations.

Figure 5:
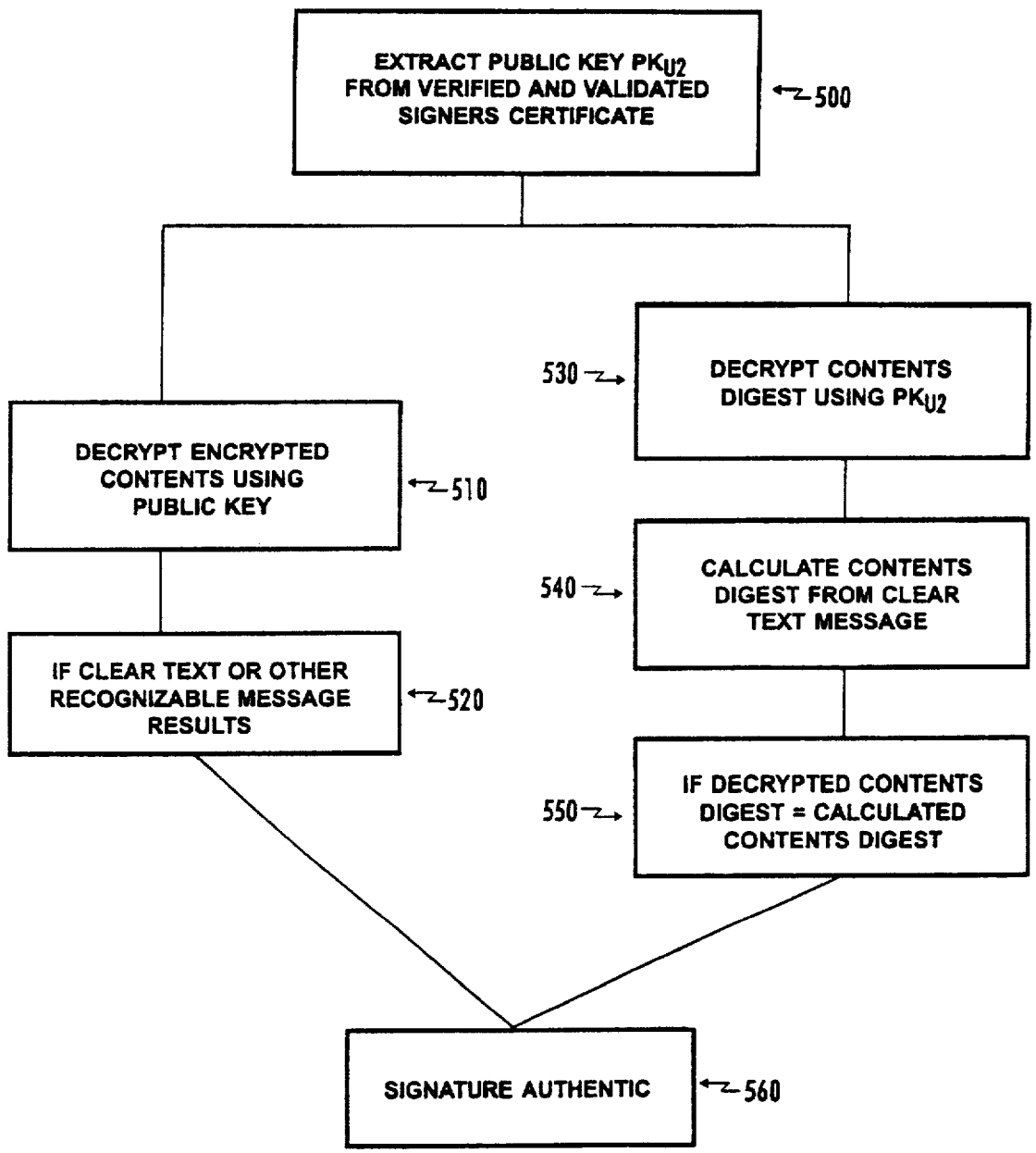
FIG. 5 illustrates the process by which a signature may be verified.

FIG. 5 illustrates the process by which a signature may be verified.

Once U1 has determined that he has a valid public key for user U2 using the verified and validated certificates, there are two ways ensuring that the signature is authentic. These two ways relate to how the signature was generated. As discussed above, in one signature mode, the entire document is encrypted with the private key of the sender. Thus, if one decrypts the encrypted contents using a public key (510) if clear text or some other recognizable message results (520), the signature is authentic (560). On the other hand, in a second signature mode a contents digest is utilized to sign the document. One would decrypt the encrypted contents digest using $PK_{U2}$ (530), calculate the digest of the contents independently using the clear text contents (540) and if the decrypted contents digest is identical with the calculated contents digest (530), the signature is authentic (560).

There are three primary reasons for revocation of a certificate. The first is the owner suspected compromise of a private key. The second is a change of user or CA affiliation. This third is certificate expiration.

Figure 6:
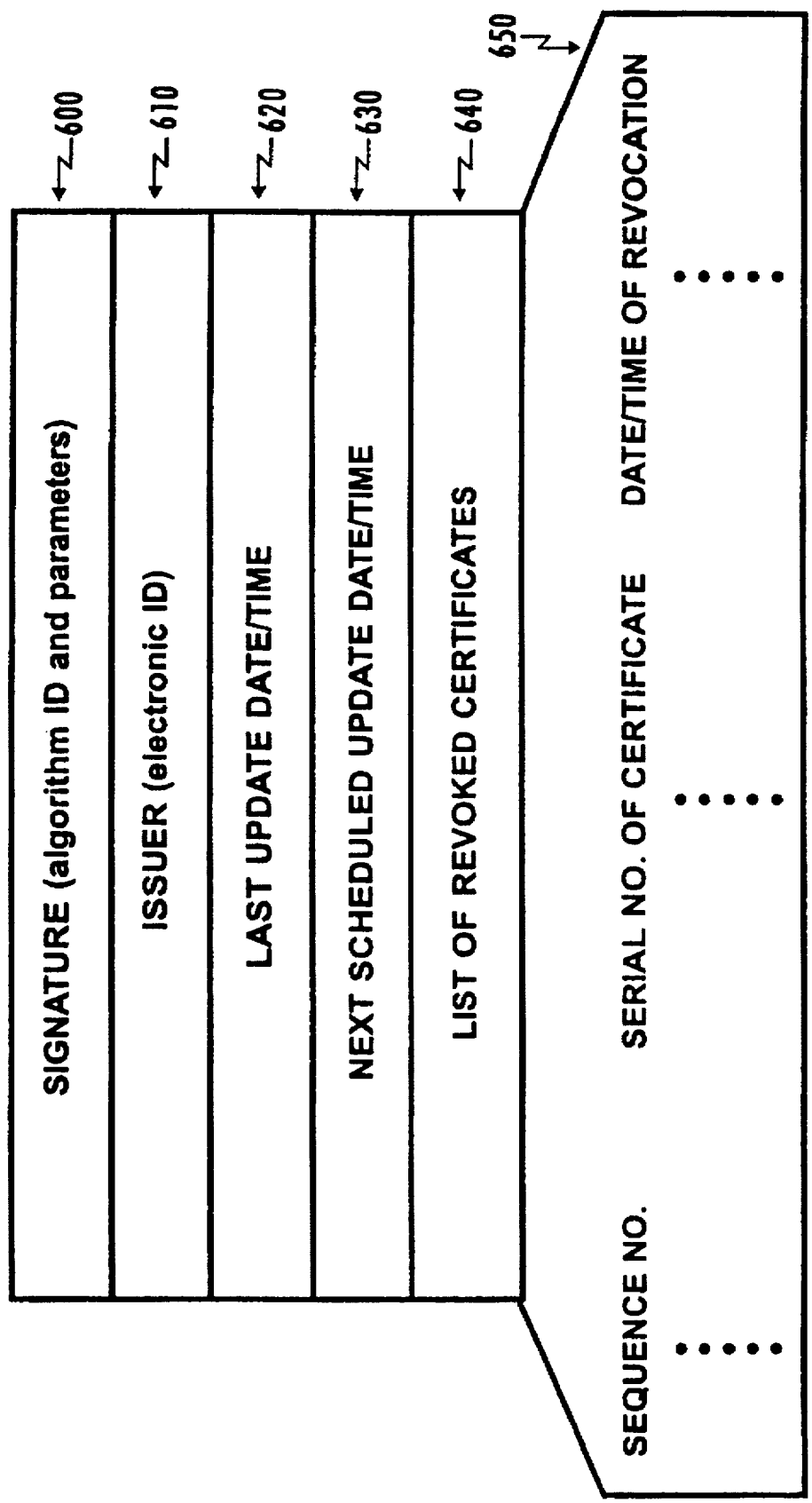
FIG. 6 represents a data structure for a certificate revocation list.

As discussed above, to validate a certificate reliably, the validator must ensure that none of the certificates utilized in validation has been revoked. To ensure that, the validator must have a correct certification revocation list from the common point of trust to the entity whose certificate is being validated. As shown in FIG. 6, a certificate revocation list is a data structure which contains a signature of the issuing party (600) together with algorithm ID and parameters used to sign the list, the electronic ID of the issuer (610), the last update date and time (620), the next scheduled update date and time (630) and a list of revoked certificates (640), arranged as shown, for example, in block 650. Revoked certificates are denoted by their sequence numbers in a sequential order and for each sequence number list the serial number of the certificate being revoked and the date and time of its revocation.

To retrieve the current CRL of all relevant CA's, a user can send a CRL_Request message to the station and receive the list back in the form of a CRL_Reply message. When the list returns, it may be stored in the CRL data base using the CRL_Store command. In some systems, it may be preferred to use a common repository which maintains authenticated copies of CRL's for all CA's in the entire system. A CRL may then be obtained by CRL Request message directed to the common repository and receive the response back via CRL_Reply message from the common repository. When using a common repository, a CA may send a copy of its current CRL to the common repository using the CRL_Store message. Once it has been successfully received by the common repository, a reply will be sent to the sending CA using the CRL_Confirm message format. As discussed in conjunction with the verification process of FIG. 4, current CRL's are required in order to properly authenticate and verify the certificates.

When using the public key infrastructure of the invention, it is often required to fetch certificates. These may be fetched in advance or on an as needed basis. They may be fetched from owner's, issuers or certificate repositories. They are fetched using a Certificate_Request message listing the identification of the entity whose certificate is needed and the certificate is returned using a Certificate_Reply message. Certificates can be fetched by program-to-program communications, interactive HTTP, store and forward mail, or any type of communications.

The Verify_Certificate process can be utilized two ways. First, it can be utilized to verify all certificates between the entity for which a certificate is being verified to the common point of trust with the verifier. This will also be based on usage of CRL's to ensure that the certificate certified and all other certificates used in the process are still valid. The second option utilizes direct verification by sending a Verify_Certificate message to a common repository which is known to be trusted and the common repository responds with a currently valid certificate of the entity being validated. In this mode, no CRL's are needed.

FIGS. 7–27 describe a set of processes which collectively form the certification system, functions, and certification infrastructure of this invention. The processes may be invoked singularly or in combination and may be called by any other process. The commands and processes described in FIGS. 7–24 thus present a set of protocol and programming primitives which may be invoked either directly by a user or by part of an application process running on the user's or CA's computer. There is thus a standardized interface for all security functions desired by any computer system or user.

Figure 7:
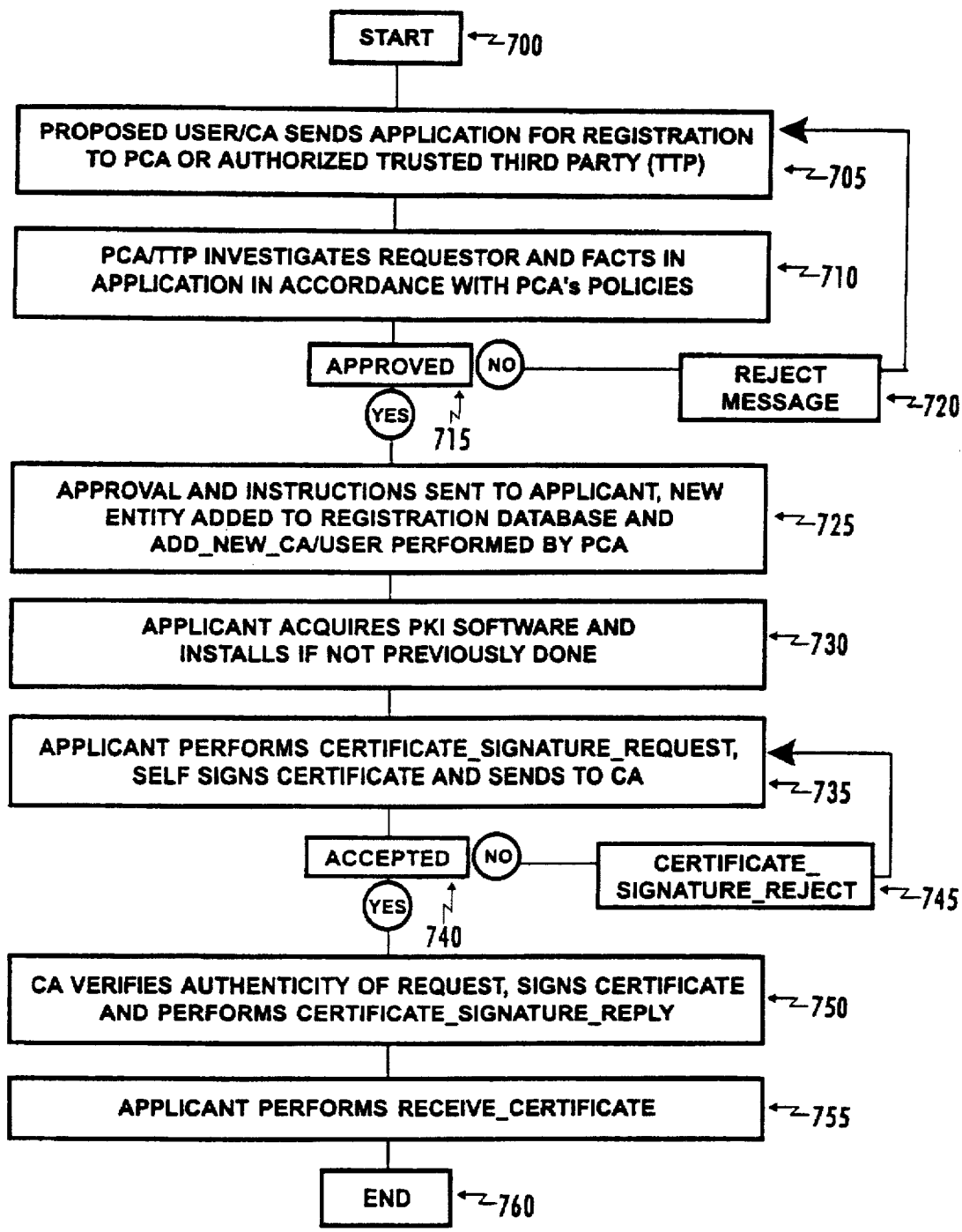
FIG. 7 is a flow chart of a registration and initial certification process.

A flow chart of the registration process for users and CAs is shown in FIG. 7. The process starts at 700 and a new user/CA sends (705) the application for registration to the policy certifying authority (PCA).

The PCA investigates the requester and the facts in the application in accordance with the PCA's policy (710). If disapproved, a reject message is sent (720) whereas if approved (715) the approval and instructions are sent to the Applicant (725), a new entity is added to the registration data base and the Add_New_CA/User process is performed. If Applicant has not already acquired the software, the Applicant acquires PKI software and installs it on his system (730). After registration, using the software, the Applicant performs the Certificate_Request process, (discussed hereinafter 735), self signs the certificate and sends it to the certification authority. If the certificate fails certain policy or format checks (740-N), a Certificate Signature_Reject message is prepared and sent to the Applicant. The Applicant may then again modify the request and submit it as previously indicated at block 735. If the Certificate_Signature_Request is accepted (740-Y), the CA verifies the authenticity of the request, signs the certificate and performs Certificate_Signature Reply (750). When the Applicant receives the certificate contained in the Certificate_Signature_Reply message, Applicant performs the Receive_Certificate process (755) and the certification process is complete.

Figure 8:
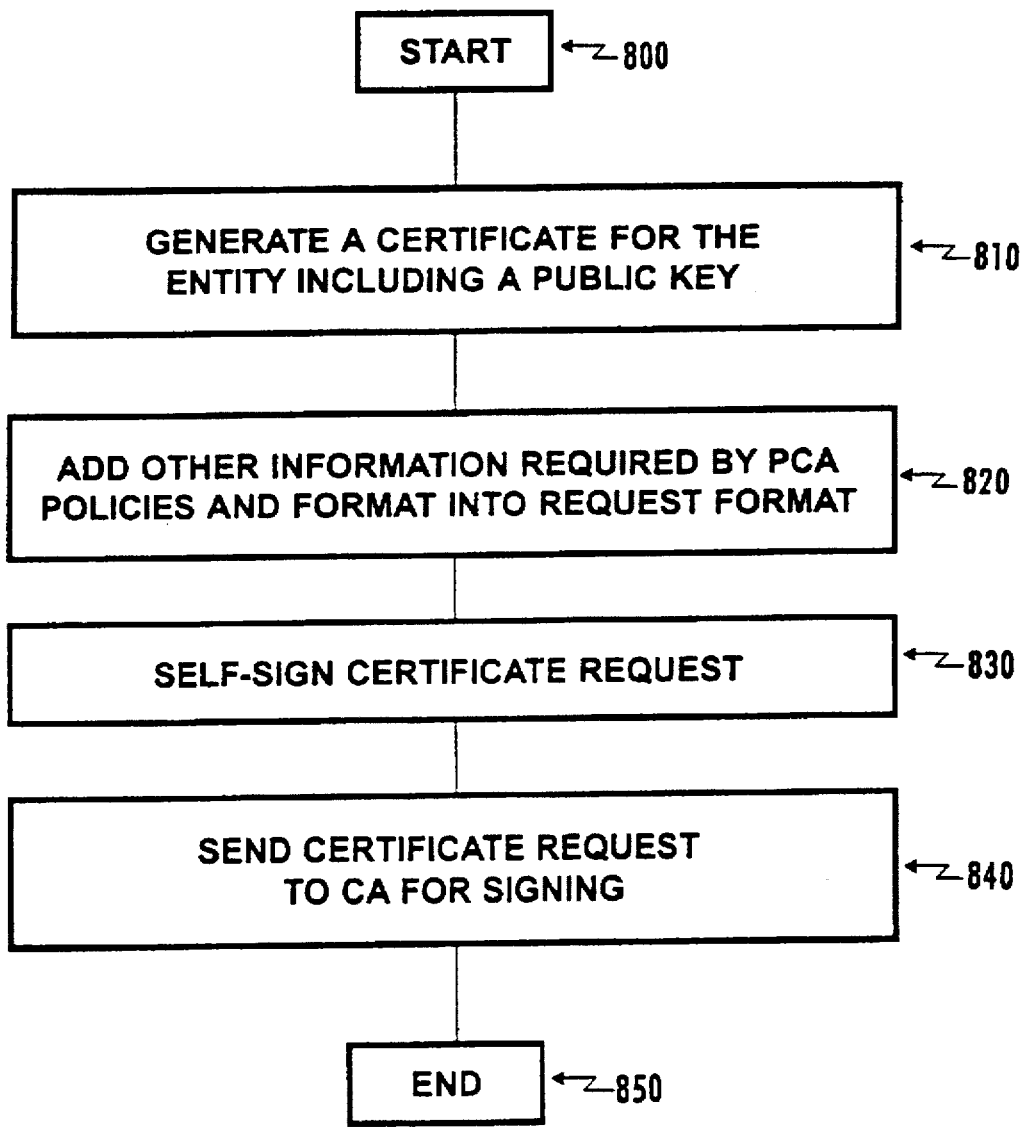
FIG. 8 is a flow chart of a Certificate_Signature_Request process.

The Certificate_Signature_Request process is described in FIG. 8. The process begins at 800 and the Applicant generates a certificate (810) including a public key. The certificate is filled in to the extent possible, absent, of course, the signature of the certifying authority. At 820, the Applicant adds whatever other information may be required by the PCA policy and formats the certificate into a request format. The Applicant self signs the certificate (830) and sends the self signed request to the CA for signing (840) using the Certificate_Signature_Request message format. The process ends at 850.

Figure 9:
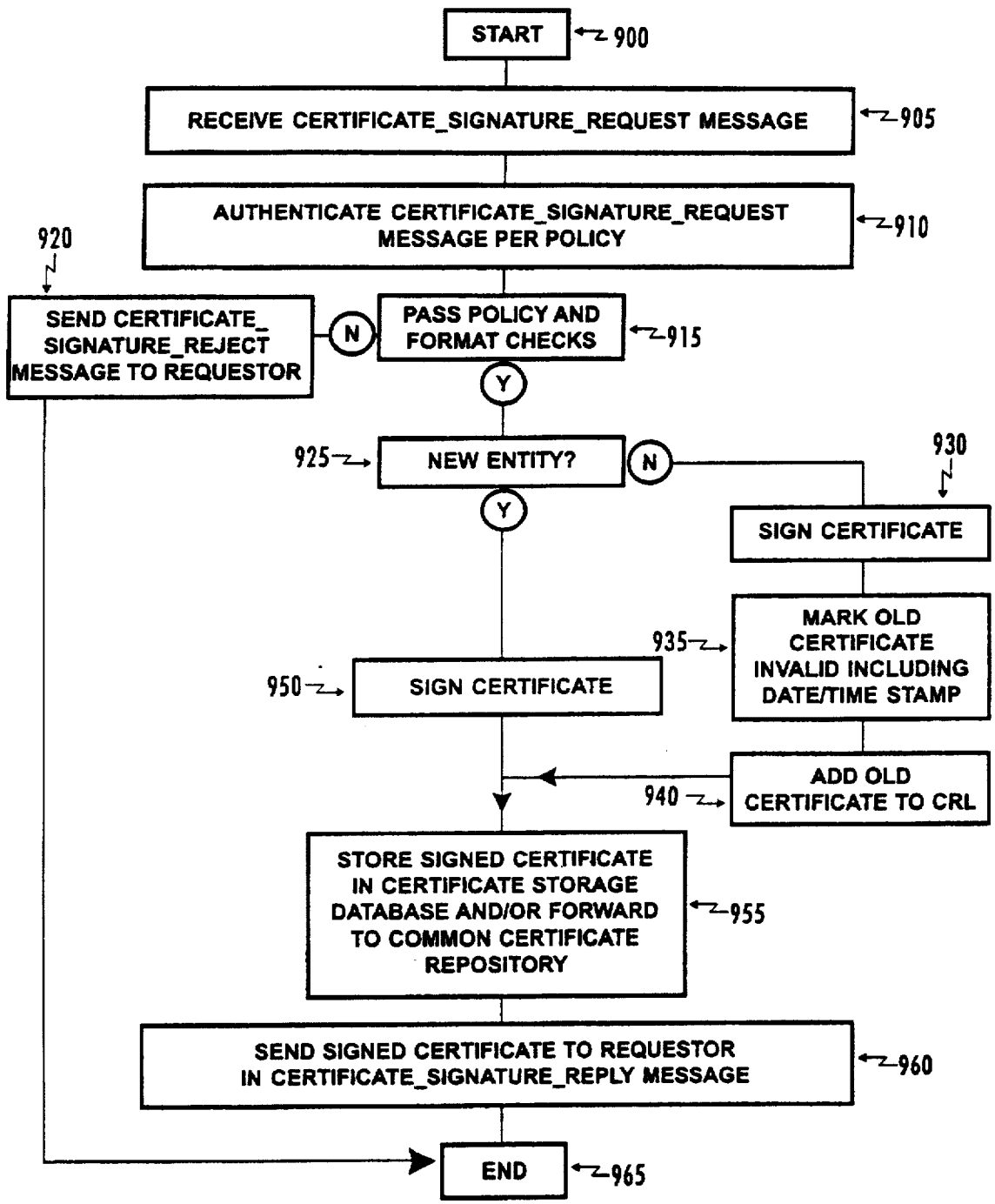
FIG. 9 is a flow chart of a Certificate_Signature_Reply process.

FIG. 9 is a flow chart of the Certificate_Signature_Reply process. The process starts at 900 by receiving a Certificate_Signature_Request message (905). The receiving authority authenticates the request in accordance with the policies set down by the policy certifying authority (910). The request message format is checked for compliance with certain formatting criteria (915). If it fails, a Certificate_Signature_Reject message is sent (920). If it passes, a check is made to see if this involves a new entity (925). If it does not (925-N), the certifying authority signs the certificate (930), marks the old certificate revoked including a date time stamp (935), and adds the old certificate to the certificate revocation list (940). If the request comes from a new entity (925-Y), the new certificate is signed (950). The signed certificate is stored in a certificate storage data base and/or forwarded to a common certificate repository (955). The signed certificate is sent to the requester in a Certificate_Signature_Reply message (960) and the process ends.

Figure 10:
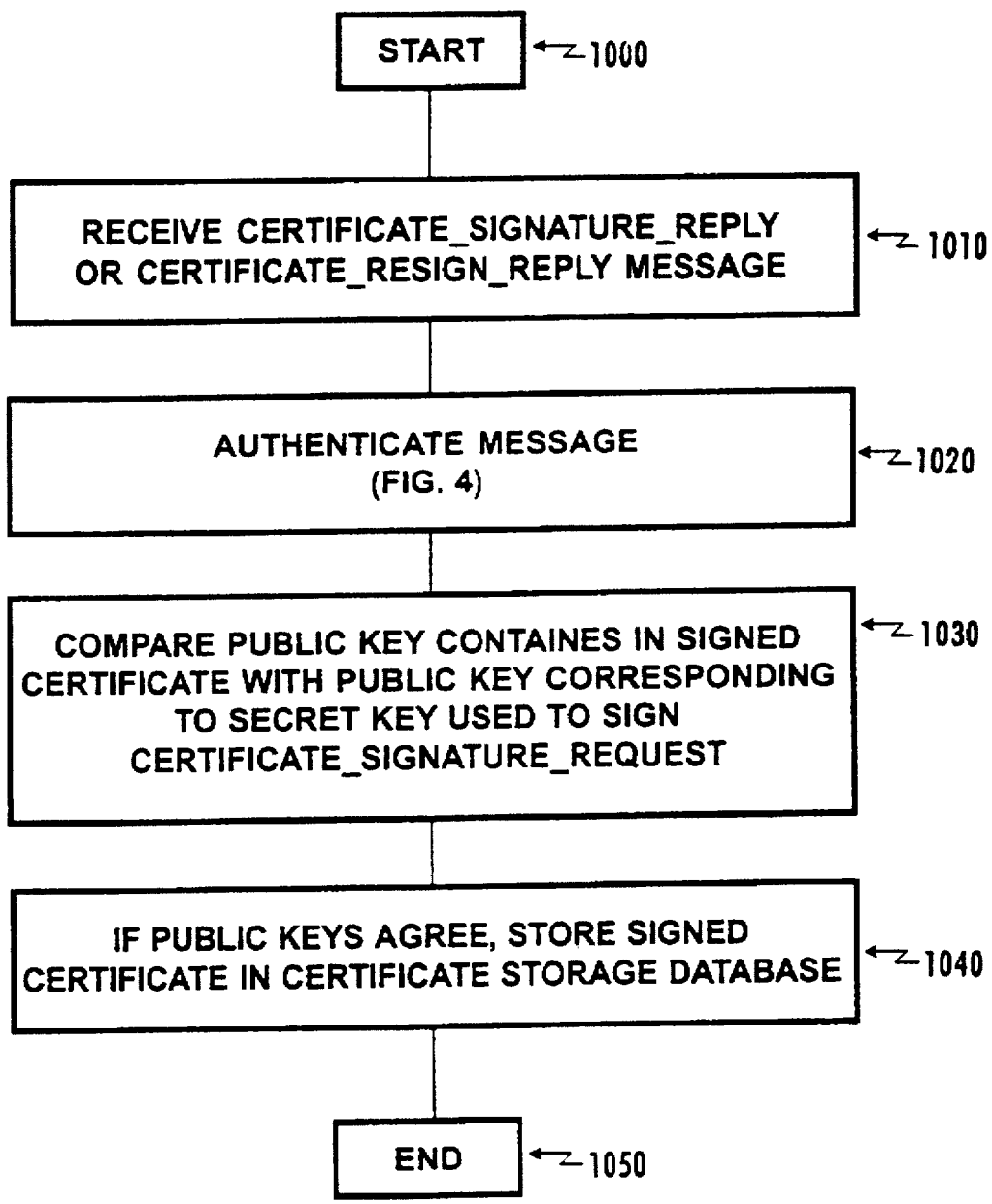
FIG. 10 is a flow chart of a Receive_Signature_Reply process.

FIG. 10 is a flow chart of the Receive_Certificate process. The process begins at item 1000 and, when a Certificate_Signature_Reply or Certificate_Resign_Reply message is received (1010), the message is authenticated (1020). The public key contained in the signed certificate is compared with the public key corresponding to the private key used to sign the Certificate_Signature_Request (1030). If the keys agree, the signed certificate from the incoming message is stored in the certificate storage data base (1040) and the process ends.

Figure 11:
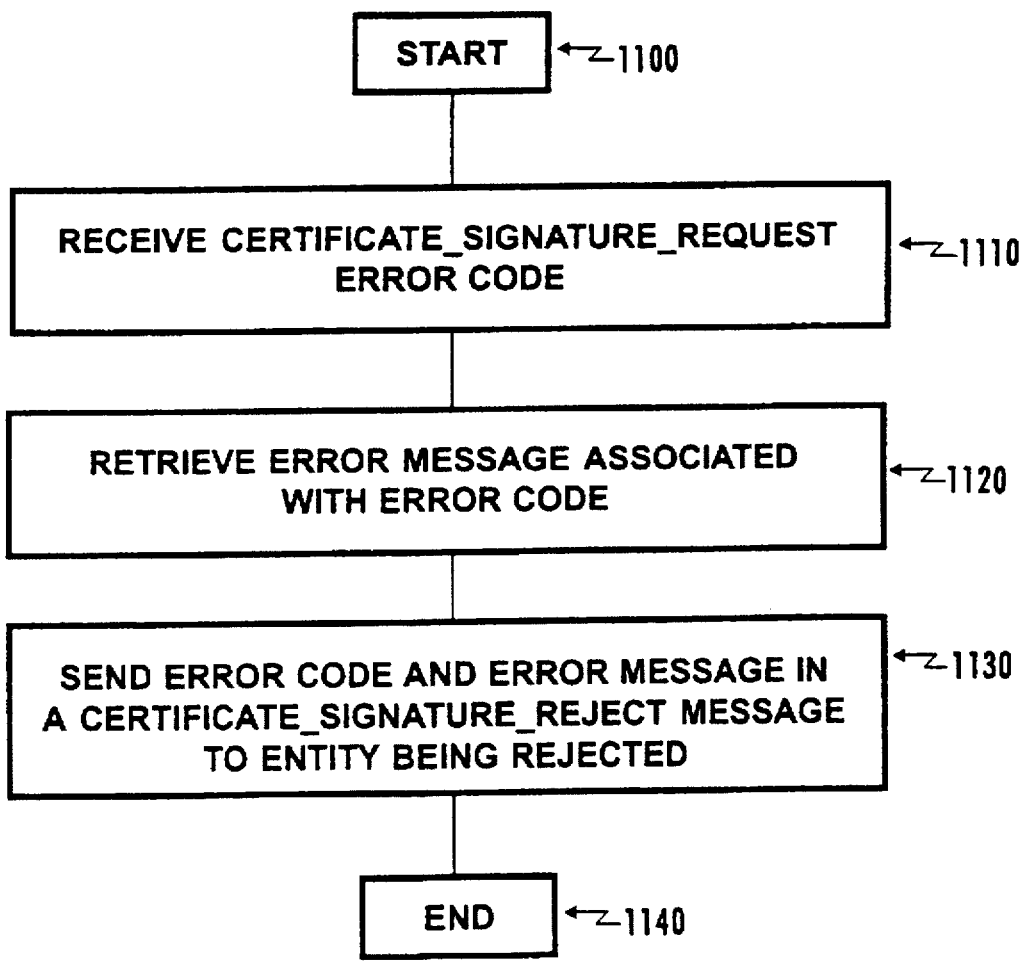
FIG. 11 is a flow chart of Certificate_Signature_Reject process.
Figure 12:
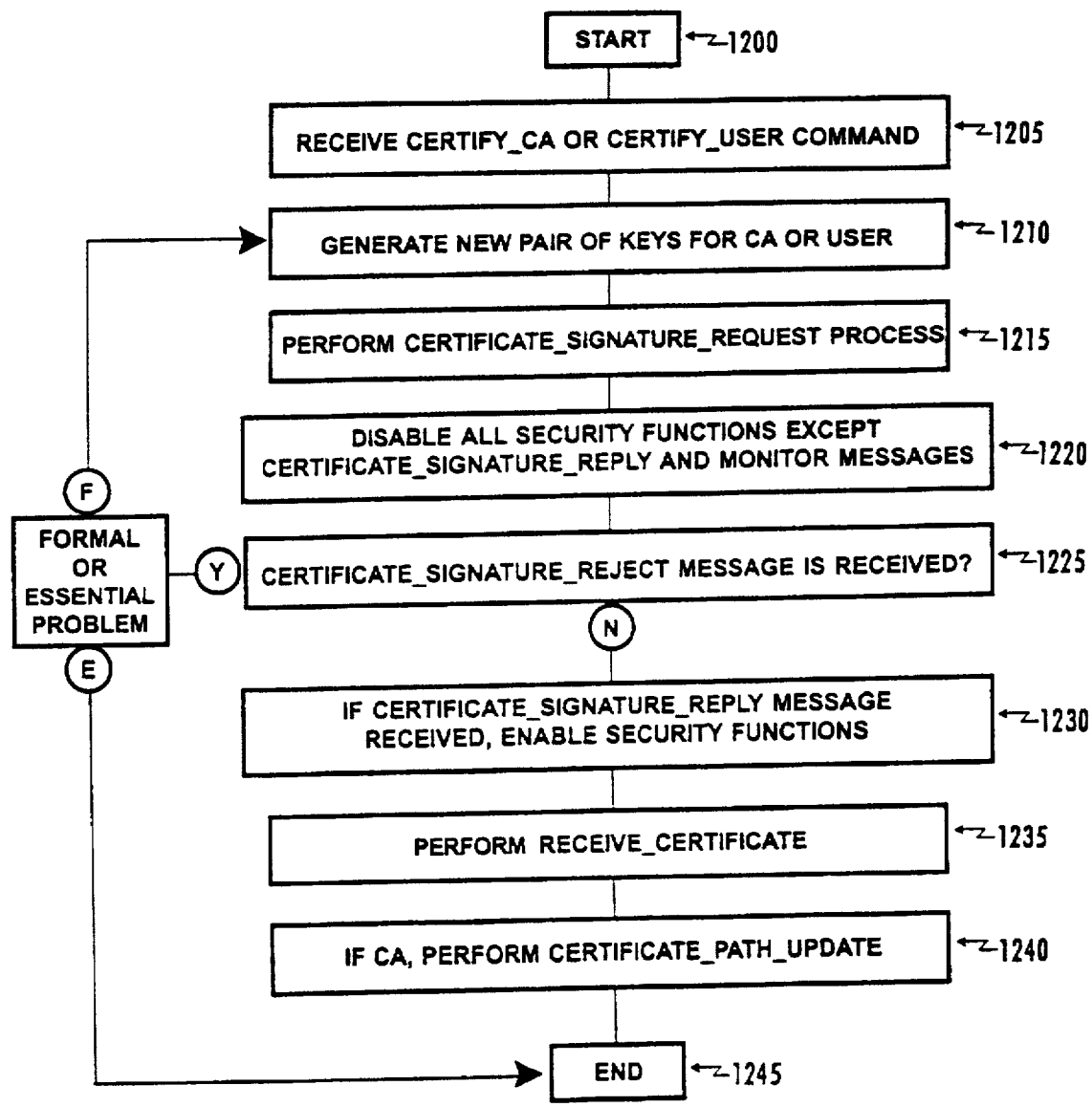
FIG. 12 is a process used to Certify_CA or Certify User.

FIG. 11 is a flow chart of a Certificate_Signature_Reject process. The process begins at (1100) upon receipt of a Certificate_Signature_Request error code (1110). The error message associated with the error code is retrieved from the error message data base (1120) and the error code and error message are sent together as part of a Certificate_Signature_Reject message to the requesting entity (1130) and the process ends. FIG. 12 is a flow chart of a Certify_CA or Certify_User process. The process begins (1200) when a Certify_CA or Certify_User command is received (1205) from a local user/CA administrator. New keys for the entity being certified are generated (1210) and the Certificate_Signature_Request process is executed (1215). While a request process is outstanding, all security functions are disabled except for Certificate_Signature_Reply (1220) until either a Certificate_Signature_Reject message (1225) or a Certificate_Signature_Reply message is received (1230). If a Certificate_Signature_Reject message is received (1225-Y), another attempt is made to submit a certificate for certification using the Certificate_Signature_Request process. Of course, a counter may be utilized to limit the number of times this loop is traversed. If a Certificate_Signature_Reply message is received, security functions are enabled (1230) and the newly received certificate is processed in accordance with the Receive_Certificate process (1235). If the entity being certified is a CA, all subordinate units must be updated with the new certificate by performing a Certificate_Path_Update function (1240) and the process ends.

Figure 13:
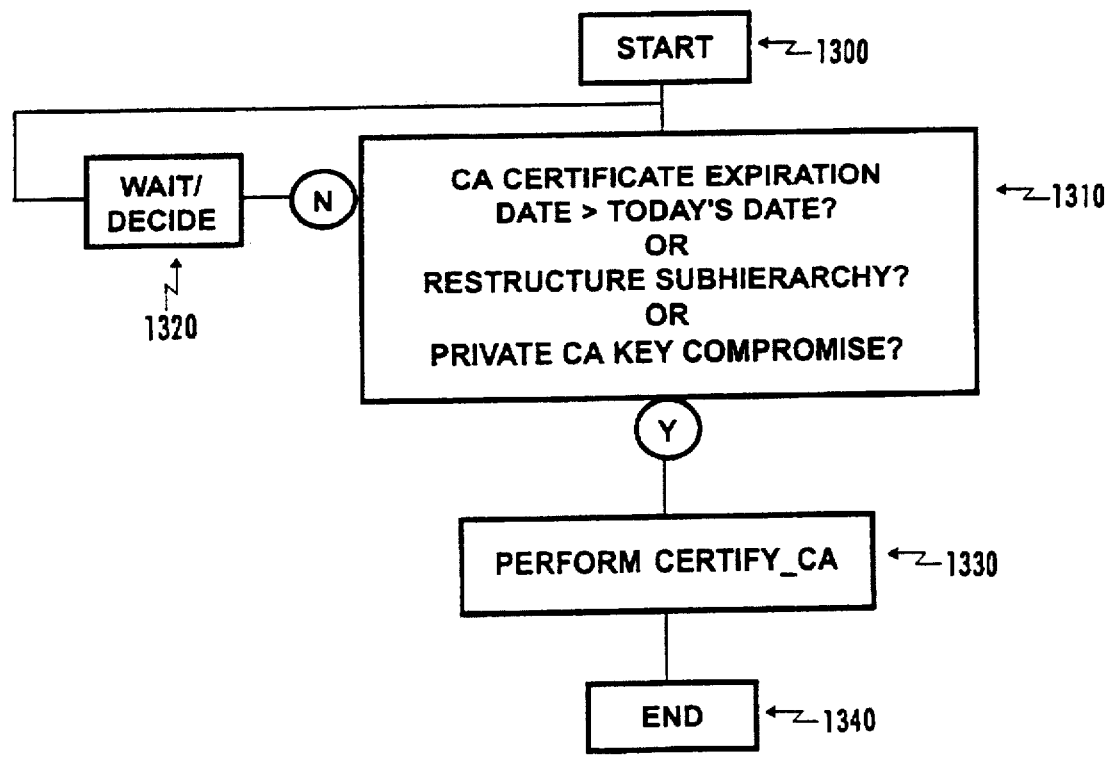
FIG. 13 is a flow chart of an Update_CA process.

FIG. 13 is a flow chart of an Update_CA process. The process begins at 1300 where a check is made to see if the CA certificate expiration date is greater than today's date (1310). If it is not, (1310-N) a certain interval of time will expire (1320) prior to rechecking the expiration date. Once CA certificate expiration date exceeds today's date (1310-Y) the process calls Certify_CA (1330) and the process ends.

Figure 14:
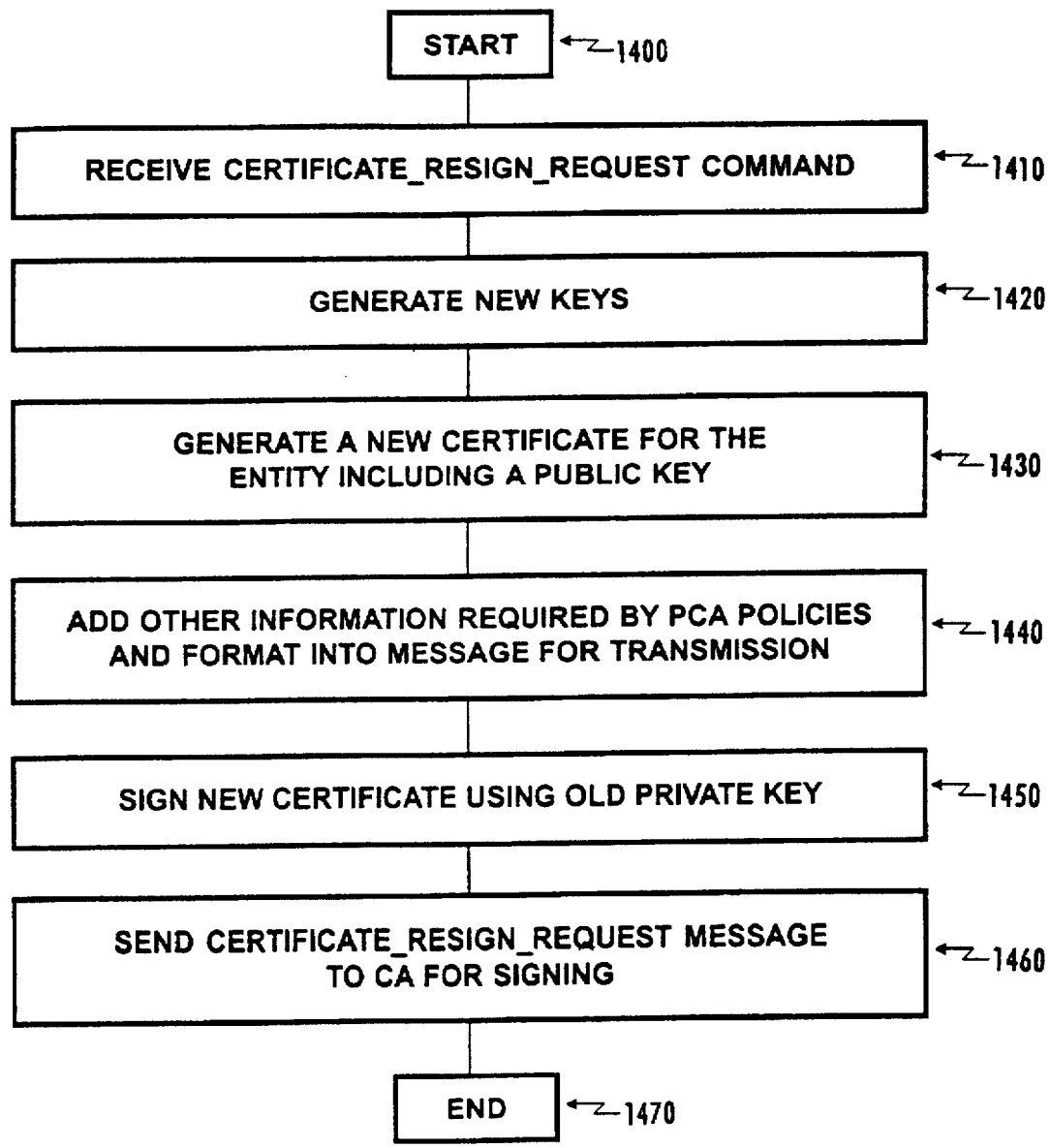
FIG. 14 is a flow chart of a Certificate_Resign_Request process.

FIG. 14 is a flow chart of a Certificate_Resign Request process. The process begins at 1400 and a Certificate_Resign_Request command is received from the local user/CA administrator (1410). A new key pair is generated (1420) and used for generating a new certificate for the entity (1430). The other information required by the PCA policies are incorporated into a request message (1440) and the new certificate is signed by the local entity using the private key corresponding to the old certificate (1450). The signed Certificate Resign_Request message is sent then to the CA for signing (1460) and the process ends.

Figure 15:
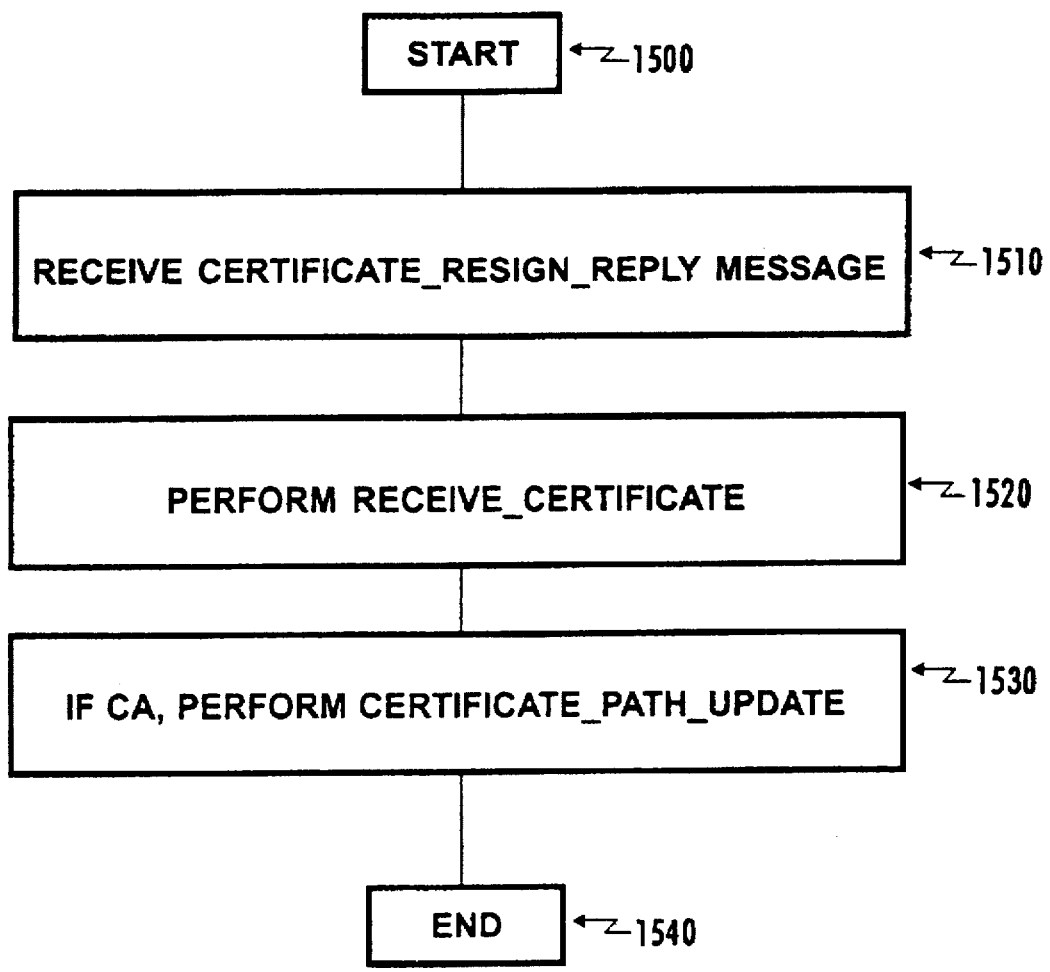
FIG. 15 is a flow chart of a Certificate_Resign Reply process.

FIG. 15 is a flow chart of a Certificate_Resign Reply message. The process begins at 1500 and a Certificate_Resign_Reply message is received (1510). When that message is received, the Receive_Certificate process is executed (1520) and if the entity receiving the message is a CA, the Certificate_Path_Update process is executed to notify all subordinate entities of the new certificate (1530) and the process ends.

Figure 16:
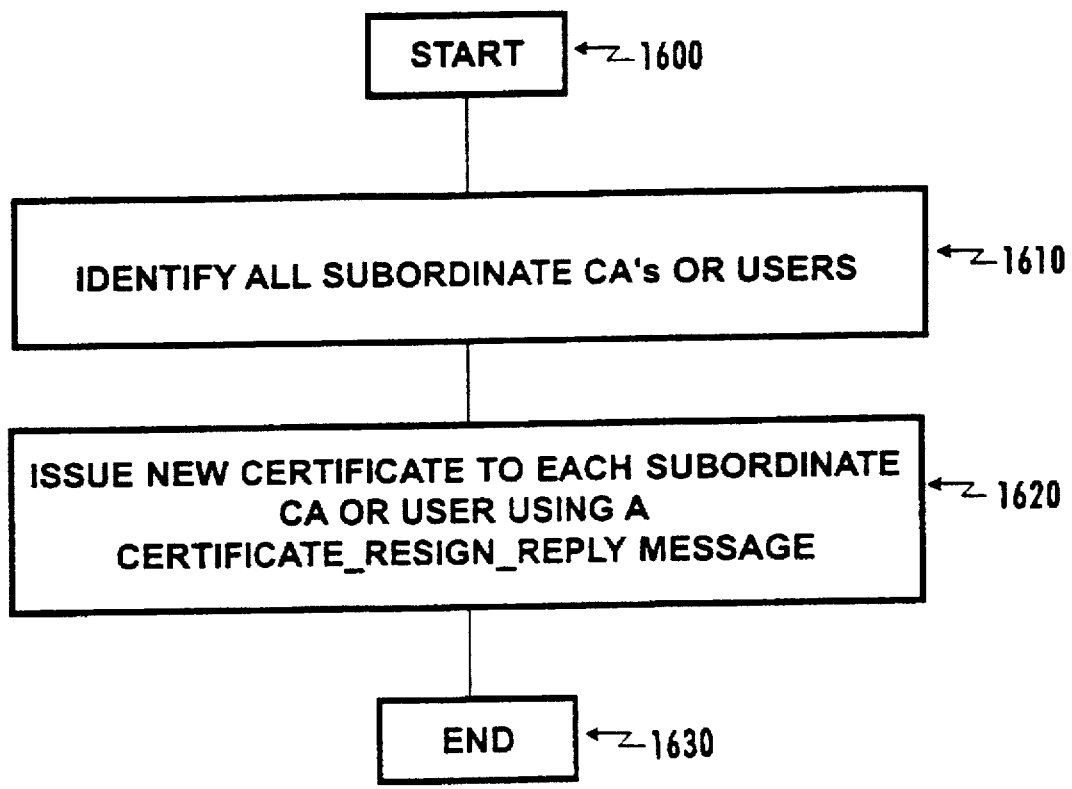
FIG. 16 is a flow chart of a Certificate_Path_Update process.

FIG. 16 is a flow chart of a Certificate_Path_Update process. The process begins (1600) and the local entity identifies all subordinate CA's or users, if any (1610). If there are some, the entity is a CA and the CA will issue new certificates to each subordinate CA and user using a Certificate_Resign_Reply message (1620) and the process ends.

Figure 17:
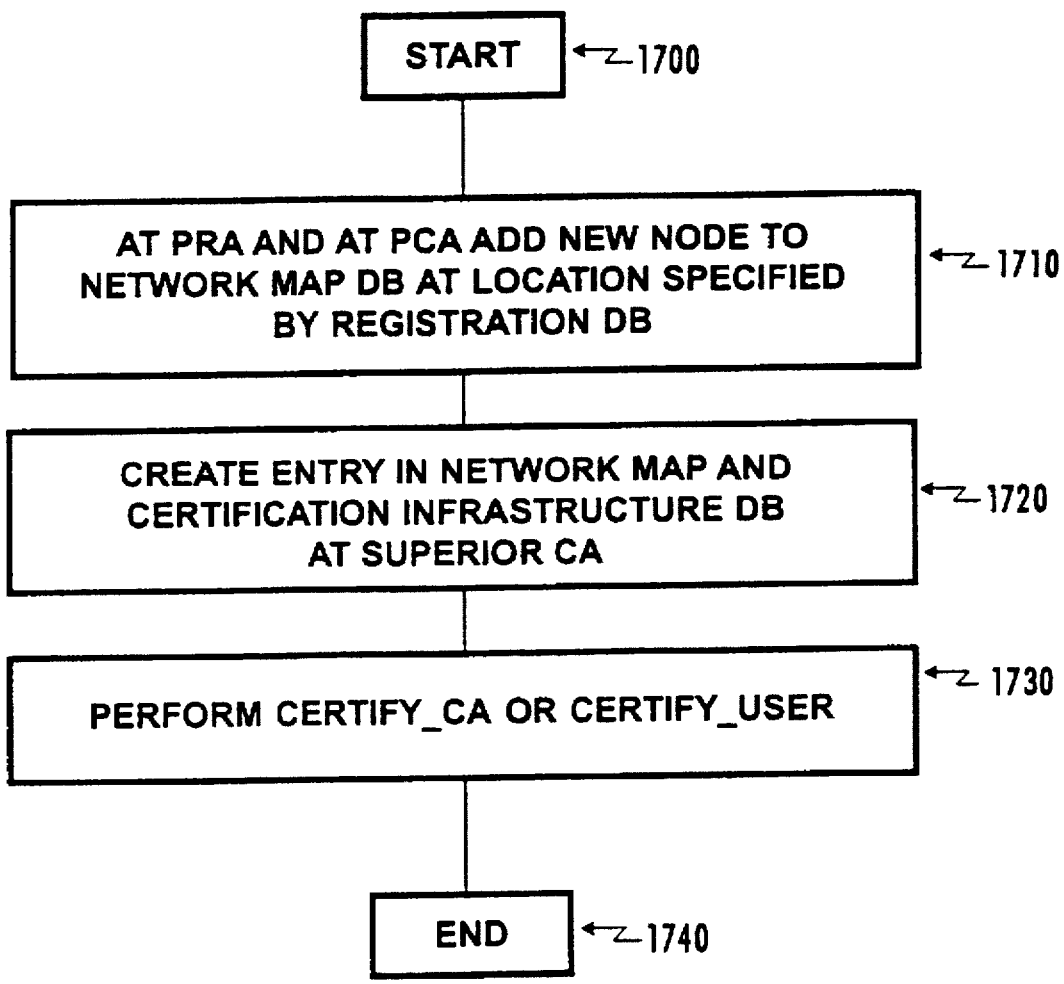
FIG. 17 is a flow chart of an Add_New_CA/User process.

FIG. 17 is a flow chart of an Add_New_CA process.

The process begins (1700) and a new CA is added to the network map certification infrastructure data base maintained by the PCA at the location specified by the registration data base entry (1710). An entry is also created in the network map and certification infrastructure data base at the superior CA specified in the registration data base (1720). The new entity performs Certify_CA or Certify_User (1730) and the process ends.

Figure 18:
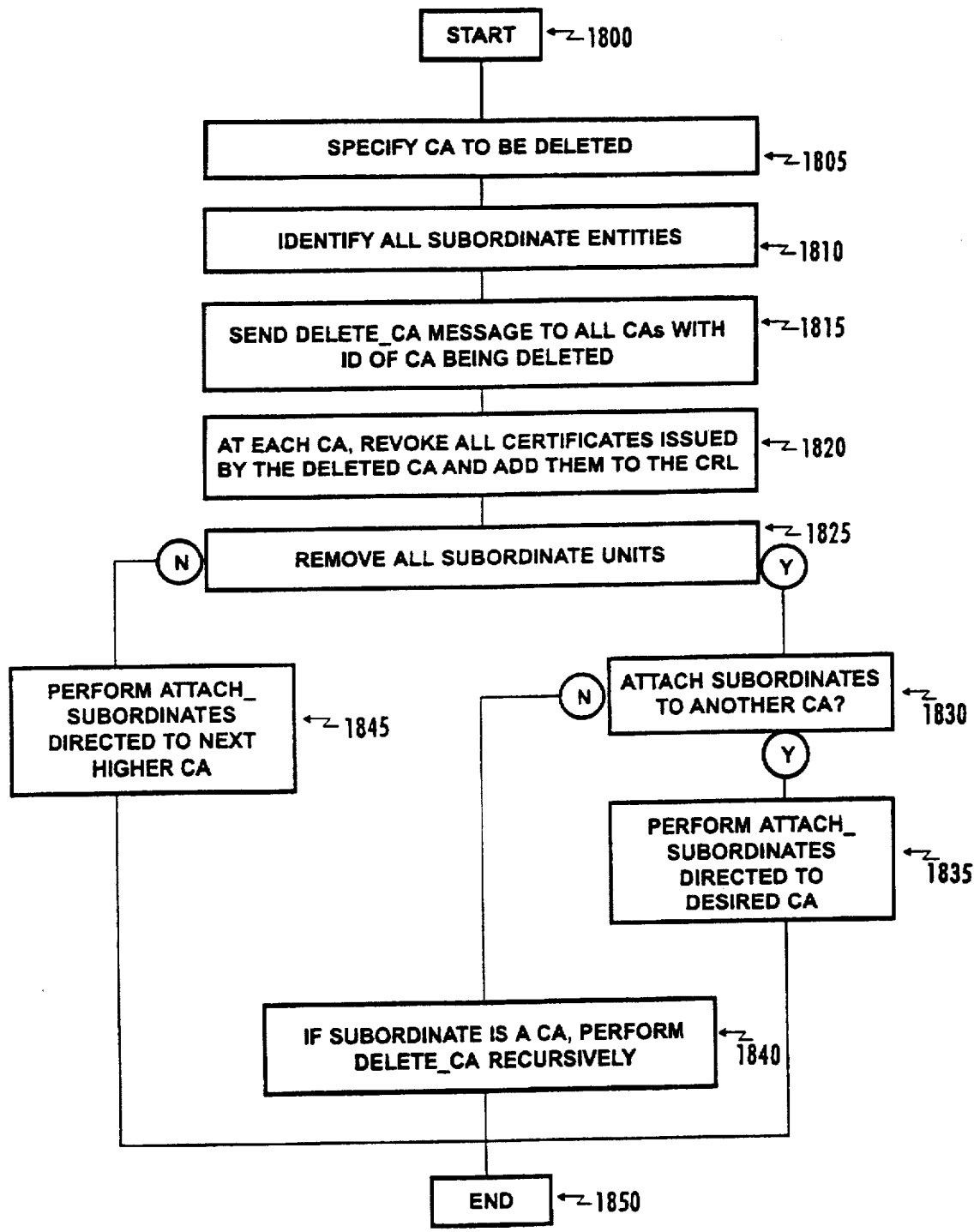
FIG. 18 is a flow chart of a Delete_CA process.

FIG. 18 is a flow chart of a Delete_CA process. The process begins (1800) by specifying the CA to be deleted (1805). All subordinate entities of the CA to be deleted are identified (1810) and a Delete_CA message is sent to all subordinate CA's specifying the identification of the CA being deleted (1815). At each CA, all certificates issued by the Deleted_CA are revoked and added to the certificate revocation list (1820). A determination is made whether or not all subordinate units are to be removed (1825). If they are not, (1825-N) the Attach_Subordinates process is executed directed to a selected CA, preferably the next higher CA (1845) and the process ends. If they are to be removed, a check is made to determine whether the subordinates are to be attached to another CA (1830). If they are, (1830-Y) the Attach_Subordinates process is executed directed to the CA where attachment is desired (1835) and the process ends. If attachment to another CA is not desired (1830-N), if a subordinate unit is a CA, this process (the Delete_CA process) is performed recursively for all subordinate CAs and the process ends.

Figure 19:
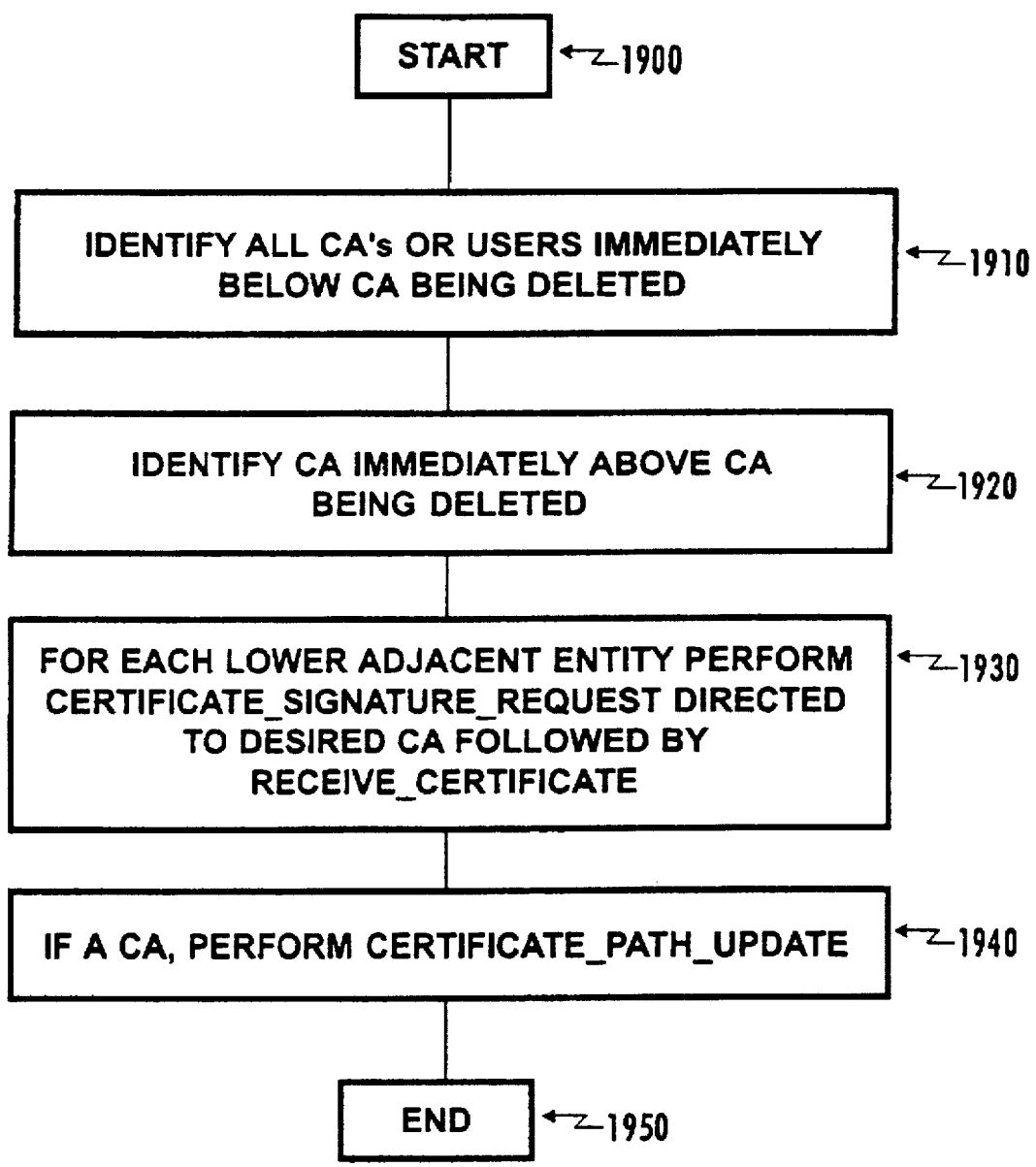
FIG. 19 is a flow chart of an Attach_Subordinates process.

FIG. 19 is a flow chart of the Attach_Subordinates process.

The process starts at (1900) by identifying all CA's or users immediately below a CA being deleted (1910). The CA immediately above the CA being deleted is also identified (1920). For each immediately subordinate CA or user, the Certificate_Signature_Request process must be performed directed to the desired CA followed by process Receive_Certificate (1930) process. If the subordinate entity is a CA, once it is attached to the new desired CA, it must do a Certificate_Path_Update to update all of its subordinate units (1940) and the process ends.

Figure 20:
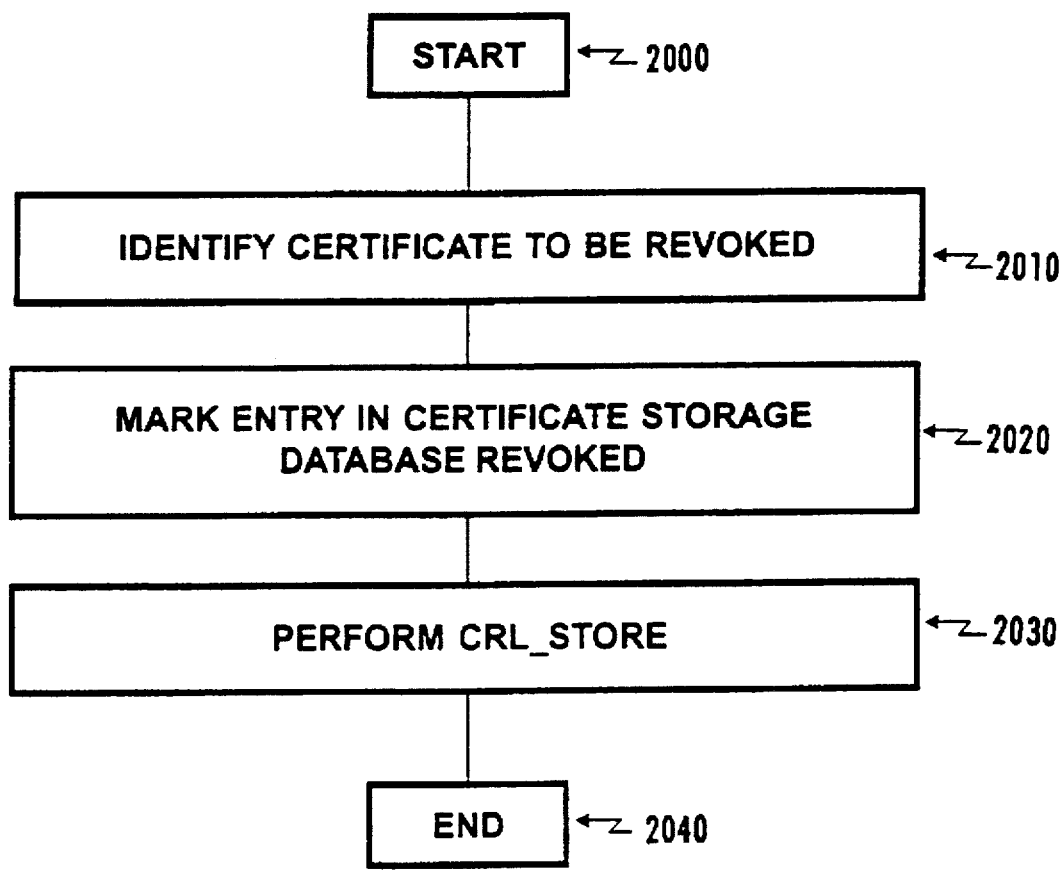
FIG. 20 is a flow chart of a Revoke_Certificate process.

FIG. 20 is a flow chart of a Revoke_Certificate process. The process starts at 2000 and the certificate to be revoked is identified (2010). The certificate identified for revocation is deleted from the certificate storage data base (2020) and the information from the certificate relevant to a CRL is stored using the process CRL_Store (2030) and the process ends.

Figure 21:
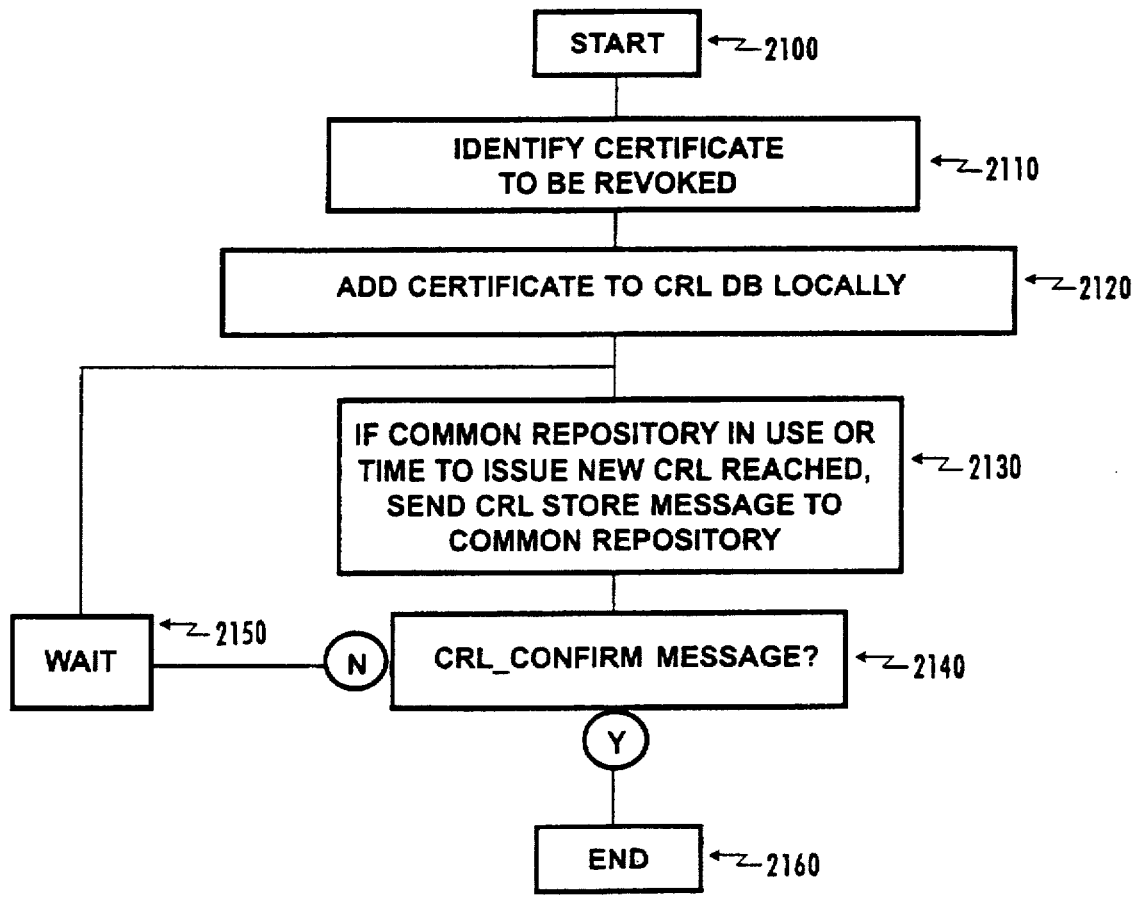
FIG. 21 is a flow chart of a CRL_Store process.

FIG. 21 is a flow chart of the CRL_Store process. The process begins (2100) and the certificate to be revoked is identified (2110). The information required for entry in the CRL data base locally is extracted from the certificate identified (2120) and a record for the revoked certificate is added to the CRL. If a common repository is in use, the entity sends a CRL_Store message to the common repository (2130). If a CRL Confirm message is received back from the common repository (2140) the process ends. Otherwise, after a period of time, another attempt will be made to update the CRL at the common repository (2150). Of course, a counter can be utilized to limit the number of times the loop is traversed before a failure is declared.

Figure 22:
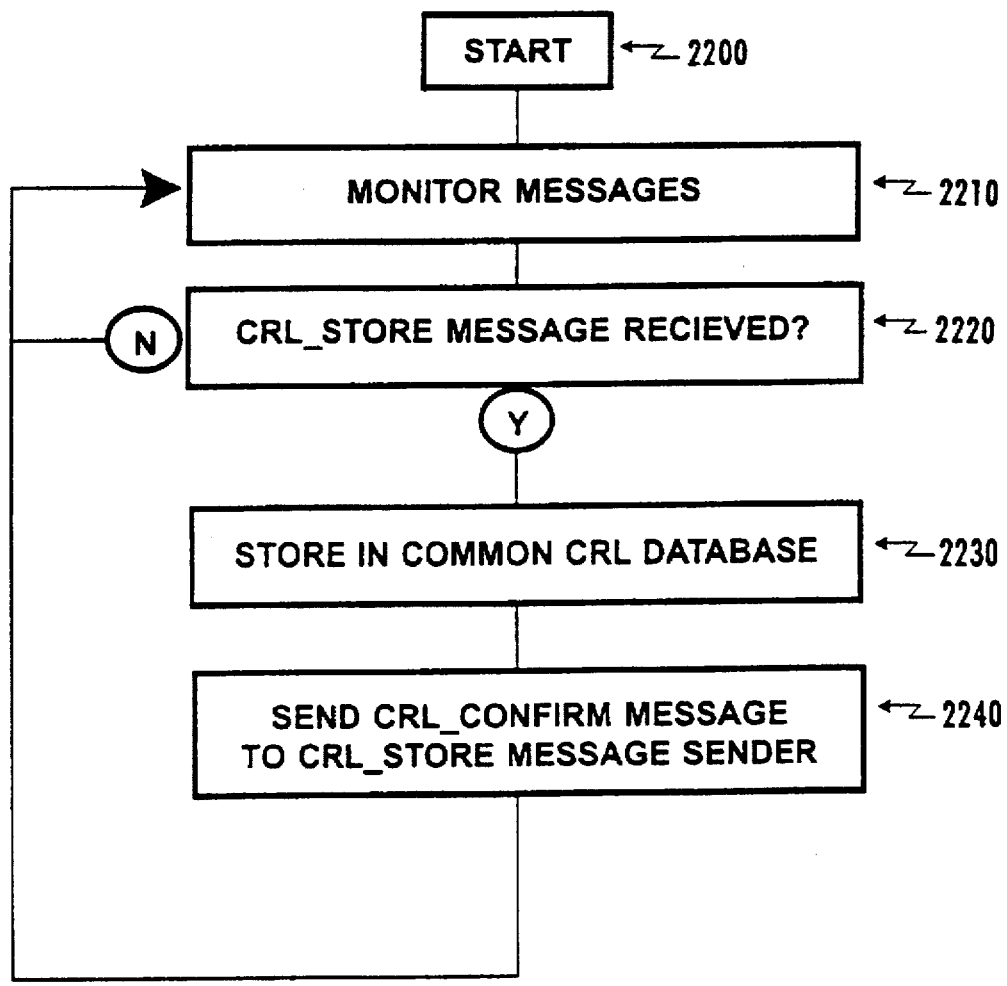
FIG. 22 is a flow chart of a CRL_Confirm process.

FIG. 22 is a flow chart of a CRL_Confirm process. The process starts (2200) and incoming messages are monitored (2210). If a CRL_Store message is received (2220-Y) the CRL information is extracted from the message and stored in the common CRL data base (2230). Once the storage in the common CRL data base is confirmed, a CRL_Confirm message will be sent back to the CRL_Store message sender (2240) and message monitoring will resume. If a CRL_Store message is not received, (2220-N) monitoring of messages will resume.

Figure 23:
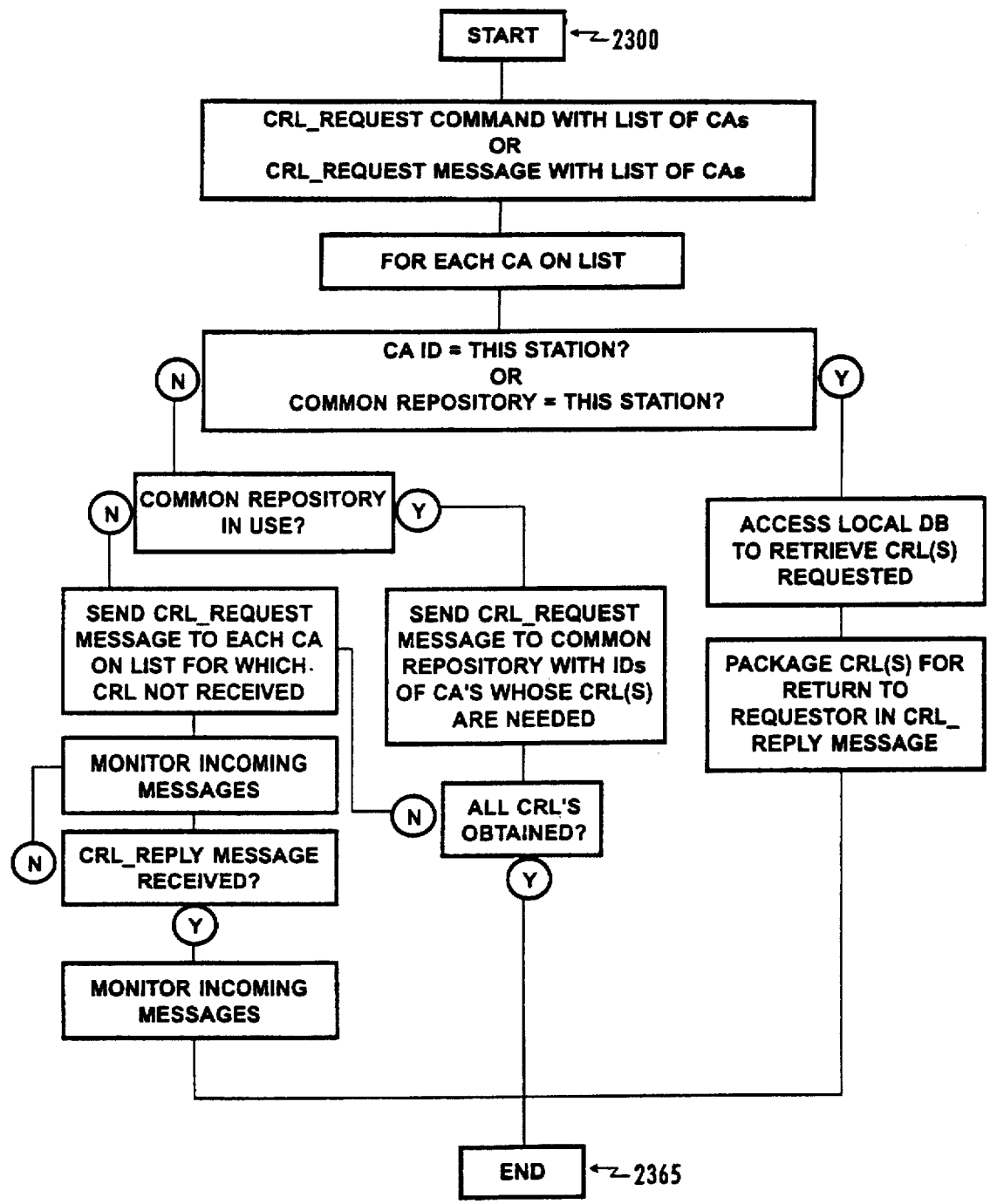
FIG. 23 is a flow chart of a CRL_Request process.

FIG. 23 is a flow chart of the CRL_Request process. The process begins (2300) and a CRL_Request command with a list of CA's or a CRL_Request message with a list of CA's arrives (2305). For each CA on the list, (2310) a determination is made whether the CA is the local station or whether the message is addressed to a common repository which is, in fact, this station (2315). If the command or request is directed to this station, the station will access a local data base and retrieve the CRL's requested (2320) and package them for return to the requester (2325). If the command or message is not directed to this station (2315-N) a check is made to determine whether or not a common repository is in use in the system (2330). If it is, the CRL request message will be sent to the common repository along with the list of ID's of the CA's whose CRL's are needed (2335). If all CRL's are obtained by this method, (2340) the process ends. If it is not, (2340-N) or if a common repository is not in use (2330-N), a CRL_Request message will be sent to each CA on the list for which a CRL has not been received (2345). After the messages are sent, incoming messages will be monitored (2350) to determine whether a CRL_Reply message has been received (2355). If it has not been, monitoring of incoming messages will resume. If it is received, the CRL's included in the CRL_Reply message will be extracted and packaged for return to the requesting process (2360) and the process ends.

Figure 24:
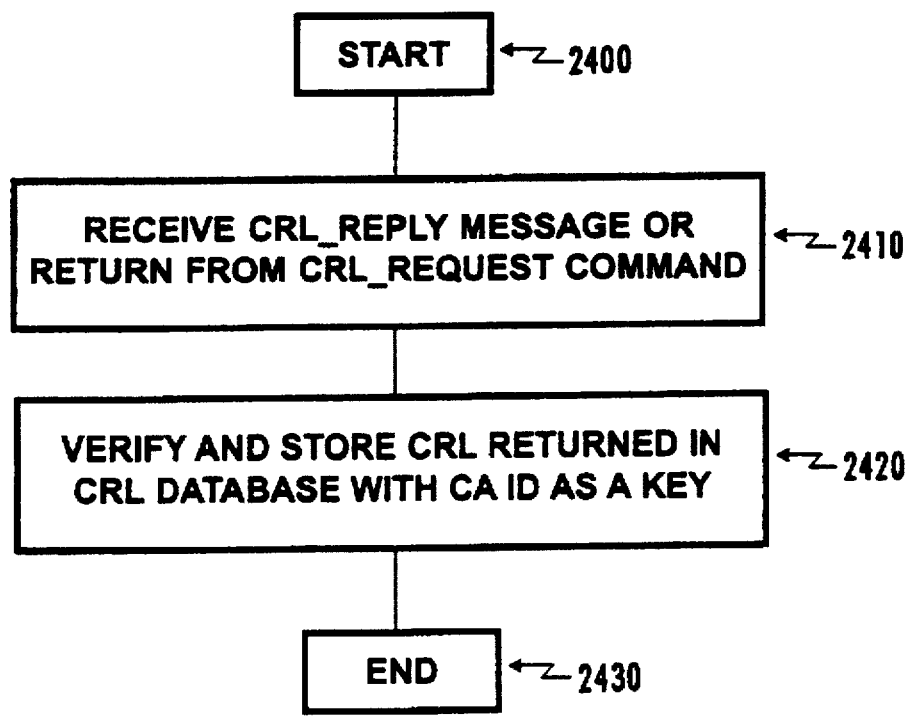
FIG. 24 is a flow chart of a CRL_Reply process.

FIG. 24 is a flow chart of the CRL_Reply process. The process begins (2400) and, when a CRL_Reply message or return from a CRL_Request command is received (2410), the return CRL is stored in the CRL data base using the CA identification as a key (2420) and the process ends.

Figure 25:
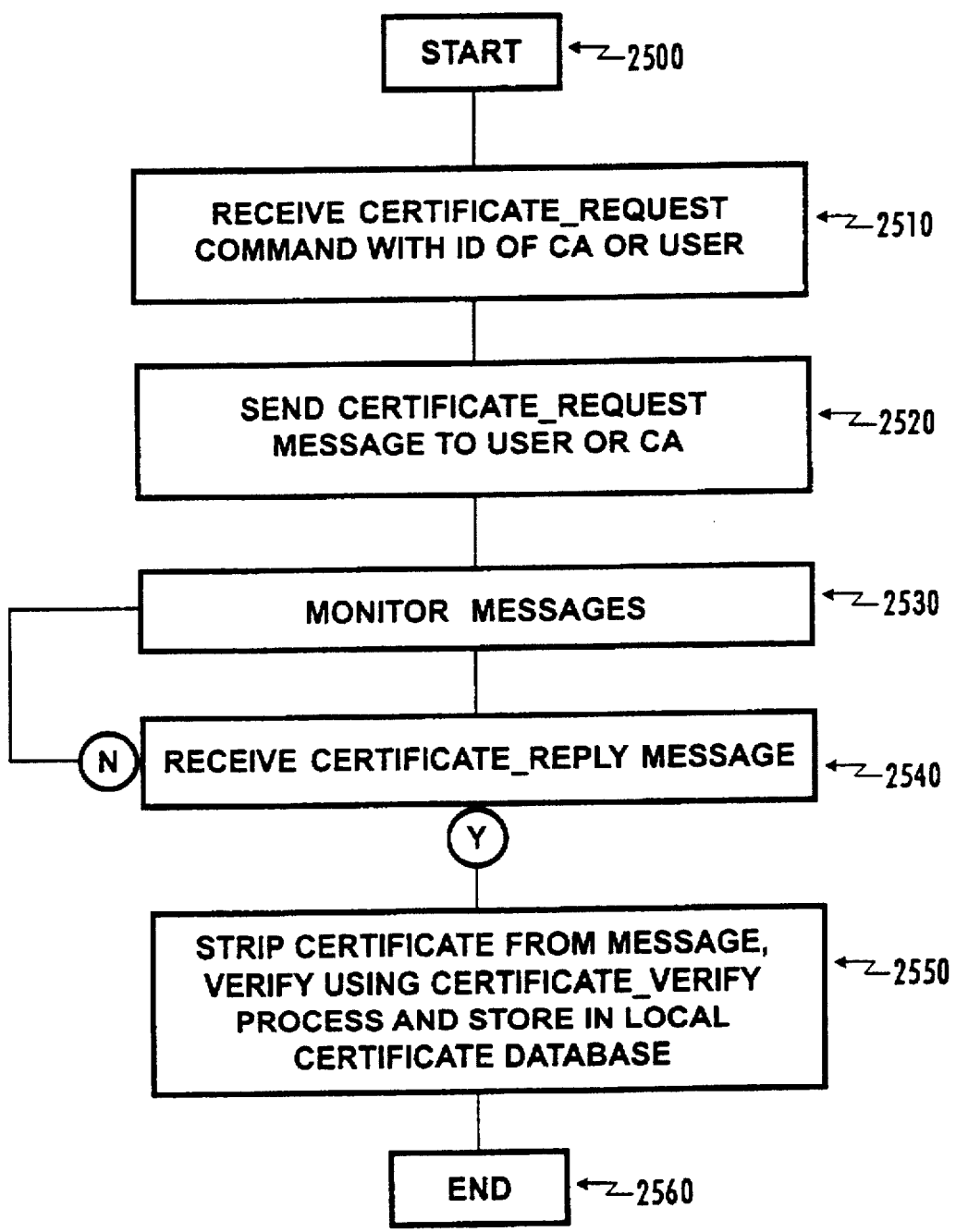
FIG. 25 is a flow chart of a Certificate_Request process.

FIG. 25 is a flow chart of a Certificate_Request process. The process begins (2500) and when a Certificate_Request command is received containing the ID of a CA or user (2510), a Certificate_Request message is sent to the user or CA (2520). Messages are monitored (2530) until a Certificate_Reply message is received (2540). Once it is received, the certificate is extracted from the message, verified and stored in the local certificate data base (2550) and the process ends. If a Certificate_Reply message is not received, monitoring will continue until a time out is exceeded in which case the process fails.

Figure 26:
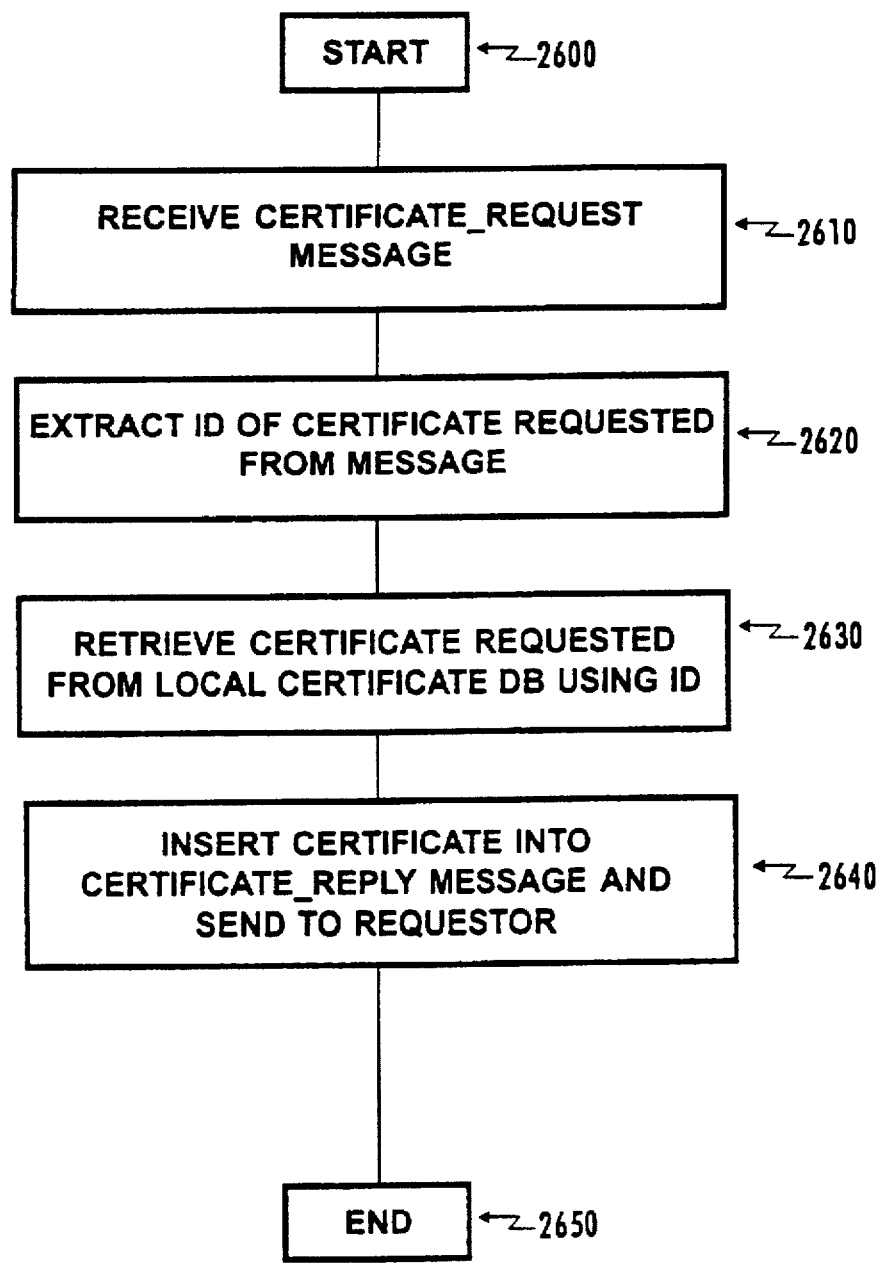
FIG. 26 is a flow chart of a Certificate_Reply process.

FIG. 26 is a flow chart of a Certificate_Reply process. The process begins (2600) and a Certificate Request message is received (2610). The ID of the station whose certificate is requested is extracted from the message (2620) and the local certificate data base is accessed using the certificate serial number to retrieve the requested certificate (2630). The requested certificate is inserted into a Certificate_Reply message and sent to the requester (2640) and the process ends.

Figure 27:
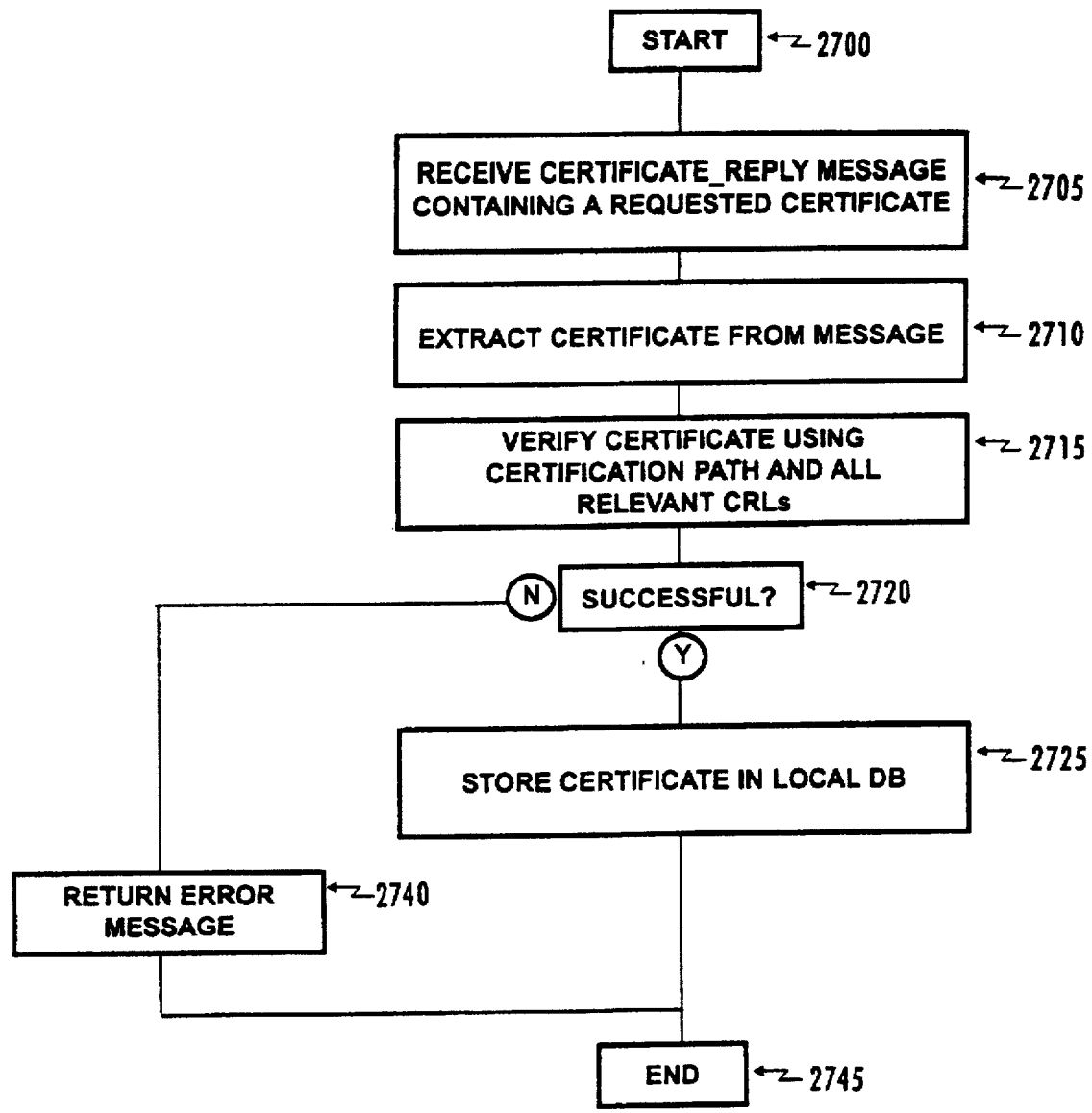
FIG. 27 is a flow chart of a Certificate_Verify process.

FIG. 27 is a flow chart of the Certificate_Verify process. The process begins (2700) and when a Certificate_Verify message containing a certificate is received (2705), the certificate is extracted. The certificate is verified and if successful, stored in the local data base. If verification fails, the error message is returned to the issuing entity.

Figure 28:
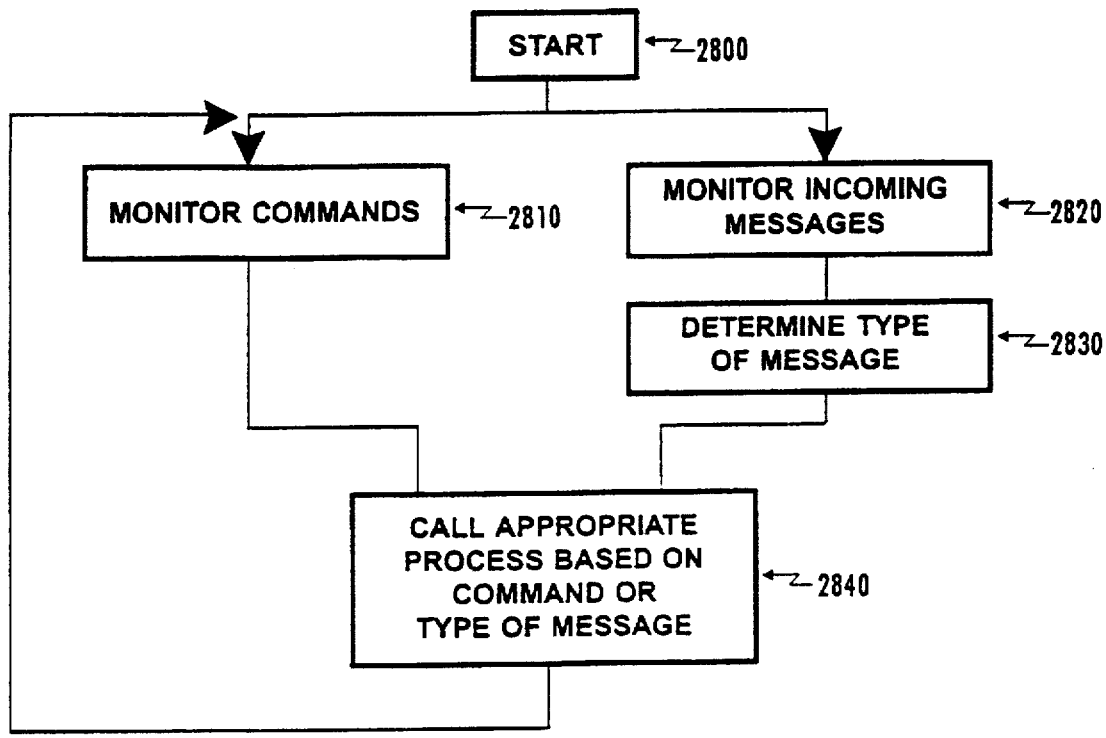
FIG. 28 is a flow chart of a Main Certification Server process.

The certification functions and protocols described in FIGS. 7-27 constitute a set of relatively independent subroutines which generally can be invoked by a direct command from a local process, IO device or received message. FIG. 28 illustrates how particular processes are invoked by these methods. The process is essentially a certification server process which begins (2800) and continuously monitors commands (2810) and incoming messages (2820). If an incoming message is received at the station, the type of message is determined (2830) and the appropriate process invoked based on the type of message (2840). Incoming commands are also monitored (2810). The appropriate process can be invoked manually by commands as well. On an ongoing basis, therefore, locally generated commands and incoming messages are both monitored continuously and the appropriate process started, in response to either, to handle the command or message.

In the manner described, an entire public key infrastructure can be created and the components of the infrastructure interrelated so as to handle certificates in an automated and convenient manner with a consistent certification functions which are easy to use directly or as part of a program. The techniques made available by the infrastructure can thus be applied in entire universive electronic transactions, beyond merely simple secure E-mail.

In addition, the problems and shortcomings of the prior art are eliminated using the disclosed public key infrastructure described herein.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A certification system for issuance, distribution and verification of public key certificates which may be used for secure and authentic electronic transactions over open networks, comprising computer processes implementing certification servers, certification clients and certification protocols, in which:
   a. one or more first computer processes are associated with at least one initial (root) registration authority,
   b. one or more second computer processes are associated with policy certification authorities,
   c. one or more third computer processes are associated with certification authorities, and
   d. one or more end-user computer processes or application computer processes are associated with respective end-users or user applications, and
   e. said one or more second computer processes hold a data structure certified by said registration authority, said one or more third computer processes hold a data structure certified either by one of said policy certification authorities or other certification authorities, and end-user or application computer processes hold a data structure certified by one or more of said certification authorities,
   whereby users and applications of said system are logically located at end-points of certification chains in a certification infrastructure.

2. The system of claim 1 in which some of said certification authorities may also function as Trusted Third Parties.

3. The system of claim 1 in which some of said certification authorities may also function as Escrow Agencies.

4. The system of claim 1 in which some of said certification authorities may also function as a clearing house for or insurer of electronic transactions.

5. The system of claim 1 in which some of said certification authorities may also function as Electronic Notaries.

6. The system of claim 1 in which some of said certification authorities may also function as common repositories for electronic identities and public key certificates (Directories).

7. The repository systems of claim 6 in which said common repositories may hold electronic identities and/or public key certificates of other certification authorities, users, applications and other components in the certification system.

8. The repository systems of claim 6 in which said common certificate repositories may also hold certificate revocation lists for a plurality of computer processes in the certification system.

9. The certification system of claim 1 in which one or more computer processes may access a storage area for storing various identification, authentication and authorization data structures, certificates and certificate revocation lists.

10. The system of claim 1 in which one or more computer processes of the certification system may access storage areas for storing or fetching network configuration information, error codes and messages, or entity identification information.

11. The certification system of claim 1 in which said data structures may be electronic addresses, electronic identities or public key certificates.

12. The certification system of claim 1 in which each computer process may utilize a common application programming interface (API) either for remote access to that process or for access to encryption, certification and other local services.

13. The certification system of claim 12 in which each computer process utilizes said common application programming interface comprising a set of programming primitives implementing certification protocol steps.

14. The set of programming primitives of claim 13 in which one or more members of the set can be invoked by commands, by messages, by remote procedure calls or by any other type of computer procedure invocations.

15. The API system of claim 12 in which the applications programming interfaces may be invoked by http commands.

16. The API system of claim 12 in which the applications programming interfaces may be invoked by E-mail messages.

17. The API system of claim 12 in which the applications programming interfaces may be invoked by a program to program communication.

18. In a certification system for secure communications containing computer processes arranged in a certification infrastructure, a method of requesting and issuing a public key certificate, comprising:
   a. at a requesting computer process, generating a data structure containing the data items required for a public key certificate, including a public key, self-signing the data structure and sending the signed data structure as a certificate signature request to a computer process authorized as an issuing certification authority, and
   b. at said computer process authorized as an issuing certification authority, verifying the authenticity of said request, and if authentic, certifying and returning the data structure in a certificate signature reply.

19. The method of claim 18, further comprising: storing the received signed certificate at said requesting computer process.

20. The method of claim 18 further comprising: storing the received signed certificate or copy of a signed certificate at a common certificate repository.

21. The method of claim 18 performed when adding a new entity to a certification infrastructure, which entity may be policy certification authority, certification authority, application or end-user.

22. The method of claim 18, performed upon expiration of an existing certificate, where the new certificate may contain either the existing or a new public key.

23. In a global network with secure communications containing computer processes arranged in a certification infrastructure, a method of verifying a signed data structure sent from a sender to a receiver, comprising:
   a. obtaining a public key certificate for every computer process in the infrastructure between the sender and a common point of trust in the infrastructure and,
   b. verifying the authenticity of signatures iteratively, beginning with the common point of trust.

24. The method of verifying of claim 23 in which a public key certificate for every computer process in the infrastructure between the sender and a common point of trust is also verified against all relevant certificate revocation lists.

25. The method of verifying of claim 23 in which a public key certificate of a sender may also be verified by a direct inquiry to the certification authority which issued that certificate.

26. The method of verifying of claim 23 in which a public key certificate for every computer process in the infrastructure between the sender and a common point of trust may be obtained from respective individual computer processes.

27. The method of verifying of claim 23 in which a public key certificate for every computer process in the infrastructure may also be obtained from a common repository.

28. In a certification system for secure communications containing computer processes arranged in a certification infrastructure, a method of validating public key certificates comprising:
   using the certificate revocation lists of each computer process between a computer process or user whose certificate is being validated and a point of trust in common with the computer process or user which is validating the certificate to ensure the certificates being used in the validation process do not appear on any certificate revocation list.

29. The method of claim 28 in which retrieved certificate revocation lists are stored locally in the computer at which the certificate is being validated.

30. In a computer system for secure communications containing computer processes arranged in a certification infrastructure, a method of updating certificates comprising:
   a. at a first computer process, which possesses a certificates to be updated, updating the current certificate by
      a.1. receiving a new signed certificate from a computer process which is authorized to issue the new signed certificate,
      a.2. revoking the current certificate previously used for verification of certificates of subordinate computer processes,
      a.3. issuing new certificates to all subordinate computer processes for which certificates had been previously signed by the first computer process and copying to all subordinate computer processes the new certificate to be used for verification of new subordinate certificates, and
   b. iteratively performing the distribution of the new certificate to all subsequent subordinate computer processes, until all computer processes subordinate in the infrastructure to said first computer process have the new certificates.

31. In a certification system for secure communications containing computer processes arranged in a certification infrastructure, a method of adding a new computer process to the infrastructure comprising:

a. adding a new component to a representation of a certification infrastructure at a location indicative of where the said computer process is to be added, b. creating entries in a certificate storage database at least at both said new computer process and at the computer process authorized to certify the said new process, c. obtaining a signed certificate for the said new computer process from said computer process authorized to certify the new process and storing it at the said new computer process.

32. In a certification system for secure communications containing computer processes arranged in a certification infrastructure, a method of deleting an existing computer process from the infrastructure comprising:

a. notifying at least all computer processes certified by the existing process being deleted that said existing computer process is being deleted, b. revoking all certificates signed by said first computer process at said computer processes certified by the existing process being deleted, if any;

c. obtain new certificates for each computer process previously being certified by the said existing computer process being deleted from another certification authority being authorized to certify these computer processes in the new certification infrastructure.

33. The method of claim 32 further comprising:

adding all certificates revoked to a certificate revocation list.

34. In a certification system for secure communications containing computer processes arranged in a certification infrastructure, a method of restructuring at least part of the certification infrastructure by deleting one or more certification authorities and adding said one or more certification authorities or new certification authorities so as to derive a modified form of the certification infrastructure.

* * * * *